US012360476B2

(12) United States Patent
Zhang et al.

(10) Patent No.: US 12,360,476 B2
(45) Date of Patent: Jul. 15, 2025

(54) IMAGE-FORMING APPARATUS AND CONTROL METHOD THEREOF, AND PROCESS CARTRIDGE CHIP FOR SHORTENING FIRST PAGE OUTPUT TIME

(71) Applicant: Zhuhai Pantum Electronics Co., Ltd., Zhuhai (CN)

(72) Inventors: Hao Zhang, Zhuhai (CN); Baolong Wu, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 0 days.

(21) Appl. No.: 18/401,268

(22) Filed: Dec. 29, 2023

(65) Prior Publication Data

US 2024/0219860 A1 Jul. 4, 2024

(30) Foreign Application Priority Data

Dec. 30, 2022 (CN) ........................ 202211733559.6
Dec. 25, 2023 (CN) ........................ 202311798089.6

(51) Int. Cl.
*G03G 15/08* (2006.01)

(52) U.S. Cl.
CPC . *G03G 15/0863* (2013.01); *G03G 2215/0697* (2013.01)

(58) Field of Classification Search
USPC ........................................................... 399/12
See application file for complete search history.

(56) References Cited

U.S. PATENT DOCUMENTS

2007/0122166 A1 5/2007 Takahashi et al.
2007/0122167 A1* 5/2007 Sugiyama ............ G03G 15/553 399/24
2007/0127936 A1 6/2007 Miller
2013/0250336 A1 9/2013 Takatani

FOREIGN PATENT DOCUMENTS

JP 2005352377 A 12/2005

OTHER PUBLICATIONS

The Federal Service for Intellectual Property(FIIP) The Request of the substantive examination for No. 2023136312/28(079291). May 13, 2024 3 Pages.
The European Patent Office (EPO) The Extended European Search Report for 23220670.6 May 14, 2024 5 Pages.

* cited by examiner

*Primary Examiner* — Quana Grainger
(74) *Attorney, Agent, or Firm* — Anova Law Group, PLLC

(57) ABSTRACT

The present disclosure provides a control method of an image-forming apparatus, a control apparatus, and a process cartridge. The image-forming apparatus includes a data control unit and an engine control unit. The method includes after the engine control unit completes startup and before the data control unit completes startup, sending a response message to the engine control unit, where the response message is configured to determine whether a replacement event occurs in at least one process cartridge; and a determination result of whether the replacement event occurs in the at least one process cartridge is configured to determine whether a preset image-forming preparation operation is executed before the data control unit completes startup.

20 Claims, 6 Drawing Sheets

IMAGE-FORMING APPARATUS AND CONTROL METHOD THEREOF, AND PROCESS CARTRIDGE CHIP FOR SHORTENING FIRST PAGE OUTPUT TIME

CROSS-REFERENCE TO RELATED APPLICATION

The present disclosure claims the priority to Chinese patent application No. 202211733559.6, filed on Dec. 30, 2022, and No. 202311798089.6, filed on Dec. 25, 2023, the entirety of which is incorporated herein by reference.

TECHNICAL FIELD

The present disclosure generally relates to the field of image-forming technology and, more particularly, relates to a control method of an image-forming apparatus, a control apparatus, and a process cartridge.

BACKGROUND

An image-forming apparatus is equipped with a data control unit and an engine control unit. The data control unit is configured to perform processing including linear correction, noise reduction, bad pixel removal, detail enhancement, and the like on image data, thereby improving image output quality. The data control unit is further configured to perform operations including data sending and receiving, command sending and receiving, and the like. For example, the data control unit is configured to send and receive data through interface units (which may include, but may not be limited to, a USB port, a wired network port, a wireless network port, or other interfaces). The engine control unit is configured to control processing operations related to engine control of image formation using patterns, such as controlling an image-forming unit in the image-forming apparatus to perform image-forming operations such as charging, exposure, development, transfer, fixation, and the like. The startup of the data control unit needs running more programs, while the startup of the engine control unit needs running fewer programs. The time needed for the data control unit to complete startup is longer than the time needed for the engine control unit to complete startup. In the existing technology, when the image-forming apparatus is powered on, the data control unit and the engine control unit are provided with power supply simultaneously and started separately. Subsequently, when both the data control unit and the engine control unit have completed startup, the image-forming operation is performed according to received image-forming data. Since the startup of the data control unit needs to run more programs and the startup of the engine control unit needs to run few programs, the time needed for the data control unit to complete startup is longer than the time needed for the engine control unit to complete startup. However, when the time needed for the data control unit to complete startup is longer, the first page output time of the image-forming apparatus may also be longer, which may result in poor user experience. Therefore, there is a need to develop a method that can shorten the first page output time of the image-forming apparatus.

SUMMARY

One aspect of the present disclosure provides a control method of an image-forming apparatus, where the image-forming apparatus includes a data control unit and an engine control unit. The method includes after the engine control unit completes startup and before the data control unit completes startup, sending a response message to the engine control unit, where the response message is configured to determine whether a replacement event occurs in at least one process cartridge; and a determination result of whether the replacement event occurs in the at least one process cartridge is configured to determine whether a preset image-forming preparation operation is executed before the data control unit completes startup.

Another aspect of the present disclosure provides a control apparatus, where the control apparatus is configured to communicate with a data control unit and an engine control unit which are included in an image-forming apparatus. The control apparatus includes a sending unit, configured to, after the engine control unit completes startup and before the data control unit completes startup, send a response message to the engine control unit, where the response message is configured to determine whether a replacement event occurs in at least one process cartridge; and a determination result of whether the replacement event occurs in the at least one process cartridge is configured to determine whether a preset image-forming preparation operation is executed before the data control unit completes startup.

Another aspect of the present disclosure provides a process cartridge. The process cartridge includes a cartridge body; a developer accommodation portion in the cartridge body for containing a developer; and above-mentioned process cartridge chip.

Another aspect of the present disclosure provides a process cartridge. The process cartridge includes a photosensitive drum; a charging roller, configured to charge the photosensitive drum; and above-mentioned process cartridge chip.

Other aspects of the present disclosure may be understood by those skilled in the art in light of the description, the claims, and the drawings of the present disclosure.

BRIEF DESCRIPTION OF DRAWINGS

To clearly describe technical solutions of various embodiments of the present disclosure, the drawings which need to be used for describing various embodiments are described below. Obviously, the drawings in the following description are merely some embodiments of the present disclosure. For those skilled in the art, other drawings may be obtained in accordance with the drawings without creative efforts.

DETAILED DESCRIPTION

The present disclosure is applied to image-forming apparatuses which refer to various devices for performing image-forming jobs. The image-forming job may be at least one of generating, printing, copying, scanning, and the like. The image-forming apparatus may also be configured to receive and transmit image data.

Exemplarily, the image-forming apparatus may be an inkjet printer, a laser printer, an LED (light-emitting diode) printer, a copier, a scanner, an all-in-one fax machine, or a multi-functional peripheral (MFP) that perform above functions in a single device.

Figure 1:
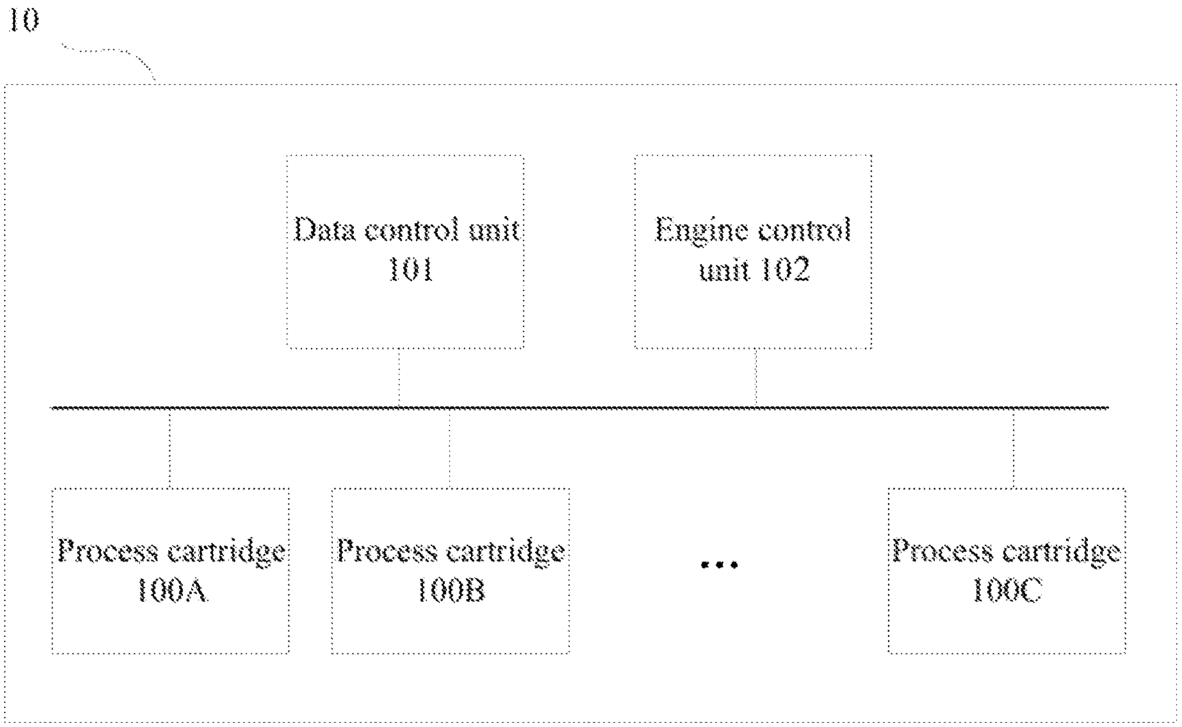
FIG. 1 illustrates a structural schematic of an image-forming apparatus provided by exemplary embodiments of the present disclosure.

FIG. 1 illustrates a structural schematic of an image-forming apparatus provided by exemplary embodiments of the present disclosure. Referring to FIG. 1, an image-forming apparatus 10 may include a data control unit 101, an engine control unit 102, and at least one process cartridge.

The process cartridge 100 may include a toner cartridge, an ink cartridge, a laser toner cartridge, an organic photoconductor (OPC), an image-forming assembly, or the like. In one embodiment, the process cartridge 100 may be a split structure, including a drum cartridge and a developing cartridge that are detachable from each other. The drum cartridge may include an organic photoconductor and a charging roller, and the developing cartridge may include a developer accommodating portion, a developing part, and a developer conveying part. In another embodiment, the process cartridge 100 may be an integrated structure. For example, the process cartridge 100 may include the developer accommodating portion, the developing part, the developer conveying part, the organic photoconductor, the charging roller, and the like. Furthermore, the process cartridge 100 may only include a housing and the developer accommodating portion. It should be noted that the process cartridge 100 may also be above-mentioned developing cartridge or drum cartridge. In an optional implementation manner, the process cartridge 100 may further include a toner hopper and/or an image-forming assembly. The toner hopper may be configured to convey toner to the image-forming assembly when the toner contained in the image-forming assembly is low, such that the image-forming apparatus may form images based on the toner conveyed by the image-forming assembly. When the process cartridge 100 includes the toner hopper, the process cartridge 100 may only include a housing and a developer accommodating portion, or include a housing, a developer accommodating portion, and a developer conveying element, which may not be limited in embodiments of the present disclosure. When the process cartridge 100 includes the image-forming assembly, the process cartridge 100 may include a housing, a developer accommodating portion, a developer conveying element, a charging roller, a photosensitive drum, and the like; and a developer convey channel may be disposed between the developer accommodating portion and the image-forming assembly, which may not be limited in embodiments of the present disclosure.

Each process cartridge 100 may be also equipped with a process cartridge chip configured to store parameters which may include consumable attribute message (e.g., a process cartridge serial number and a capacity and/or the like) and include consumable consumption message (e.g., remaining quantity of consumables and/or the like). In one embodiment shown in FIG. 1, the image-forming apparatus 10 may include a quantity N of process cartridges denoted as the process cartridge 100A, the process cartridge 100B . . . the process cartridge 100N, where N is an integer greater than or equal to 1. Exemplarily, when the image-forming apparatus 10 is a laser printer, the image-forming apparatus 10 may be a black and white printer detachably installed with one process cartridge 100 for providing a black developer; and may also be a color printer detachably installed with four process cartridges 100, where four process cartridges 100 may be respectively configured to provide developers of four colors including the black K, cyan C, magenta M, and yellow Y to the image-forming apparatus 10. In one embodiment, the engine control unit 102 and the data control unit 101 may be two functional units of two systems being respectively executed on a dual-system SoC (system on chip), where SoC may be a miniature system that includes parts of at least two systems.

Exemplarily, the data control unit 101 may be configured to perform processing including linear correction, noise reduction, bad pixel removal, detail enhancement, and the like on the image data of the image-forming apparatus 10, thereby improving the quality of images formed by the image-forming apparatus 10. The data control unit 101 may be further configured to perform operations including data sending and receiving, command sending and receiving, and the like. The data control unit 101 may be configured to send and receive data through interface units (which may include but may not be limited to a USB port, a wired network port, a wireless network port, or other interfaces). The data control unit 101 may be configured to communicate with a process cartridge chip of each process cartridge 100. In embodiments of the present disclosure, the connection manner and communication manner between the data control unit 101 and the process cartridge chip of each process cartridge 100 may not be limited. In one embodiment, the data control unit 101 may be executed on a Linux operating system.

Exemplarily, the engine control unit 102 may be configured to control processing operations related to engine control of the image-forming apparatus 10. For example, the engine control unit 102 may control the image-forming unit inside the image-forming apparatus 10 to perform image-forming operations such as charging, exposure, development, transfer, fixing, and the like. The engine control unit 102 may be configured to communicate with the process cartridge chip of each process cartridge 100. In embodiments of the present disclosure, the connection manner and communication manner between the engine control unit 102 and the process cartridge chip of each process cartridge 100 may not be limited. In one embodiment, the engine control unit 102 may be executed on a real-time operating system (RTOS), such as Free RTOS and the like. The data control unit 101 needs to run more programs when the data control unit 101 is started, and the engine control unit 102 needs to run fewer programs when the engine control unit 102 is started. Therefore, the time needed for the data control unit 101 to complete startup may be longer than the time needed for the engine control unit 102 to complete startup. For example, the startup time of the engine control unit 102 may be about 3 seconds, and the startup time of the data control unit 101 may be about 20 seconds.

When the image-forming apparatus 10 is powered on and started, the data control unit 101 and the engine control unit 102 may be powered on simultaneously and started respectively. Since the startup time needed for the data control unit 101 is relatively long, it may result that within a relatively long time interval after the image-forming apparatus 10 is powered on, the data control unit 101 may control the engine control unit 102 to perform related preparation process, which may delay the time for the image-forming apparatus 10 to start subsequent printing process and affect the use experience of the image-forming apparatus 10.

According to above, embodiments of the present disclosure provide a control method of the image-forming apparatus 10, the image-forming apparatus 10, and a process cartridge chip. After successful startup, the engine control unit 102 of the image-forming apparatus 10 may perform related preparation process. Since the startup time needed for the engine control unit 102 is relatively short, the preparation process may be started faster, which may reduce the time interval between powering on the image-forming apparatus 10 and performing subsequent printing processes (for example, the image-forming apparatus performs the first page printing process), and further improve the use experience of the image-forming apparatus 10. The technical solutions of the present disclosure are described in detail below with specific examples. Following embodiments may be combined with each other, and same or similar concepts or processes may not be described in detail in some embodiments.

Exemplary Embodiment One

Figure 2:
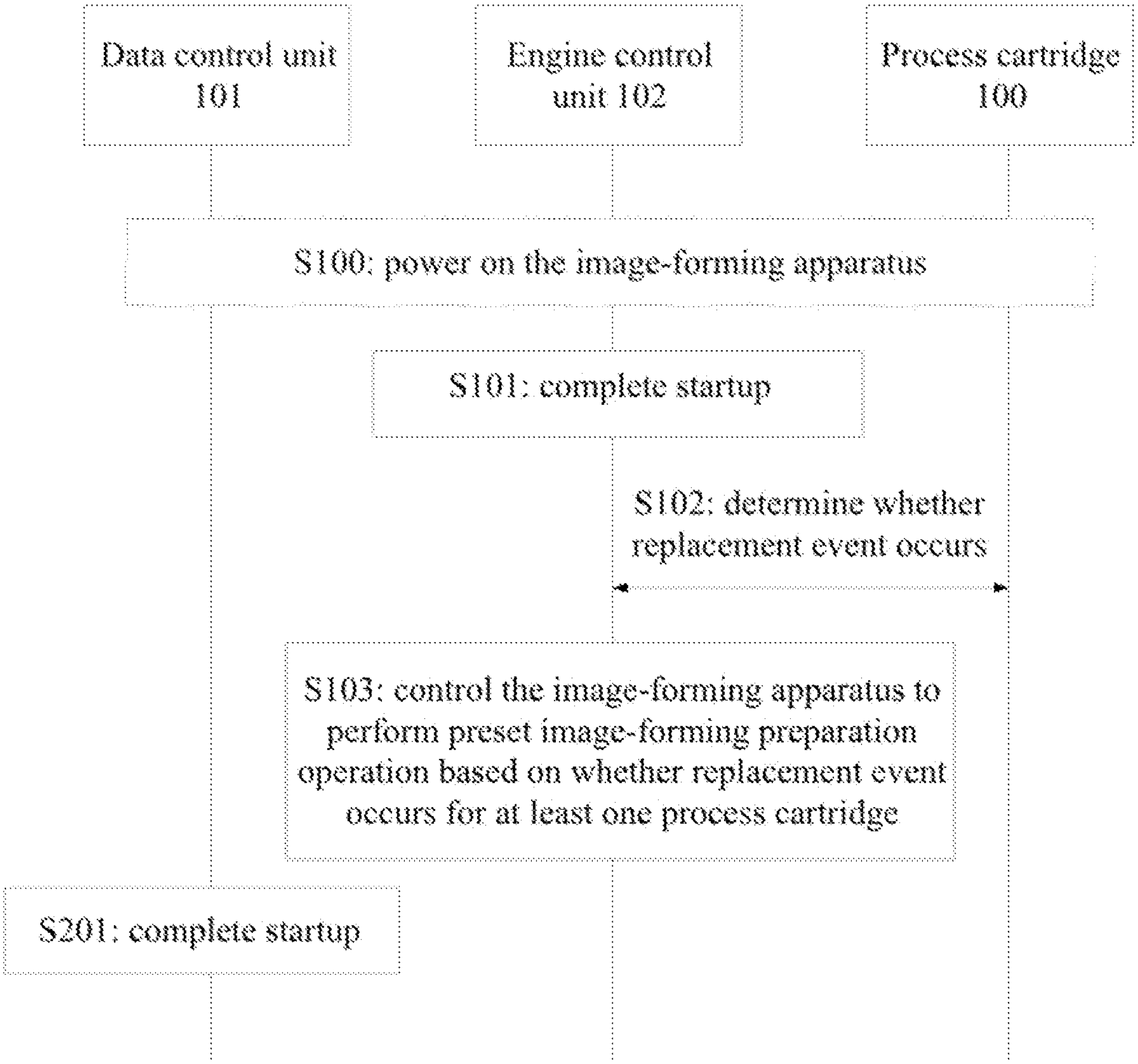
FIG. 2 illustrates a flowchart of a control method of an image-forming apparatus provided by exemplary embodiments of the present disclosure.

FIG. 2 illustrates a flowchart of a control method of an image-forming apparatus provided by exemplary embodiments of the present disclosure. The method shown in FIG. 2 may be applied to the image-forming apparatus 10 shown in FIG. 1 and executed by the engine control unit 102 and the process cartridge chip of the process cartridge 100. For example, the control method of the image-forming apparatus shown in FIG. 2 may include following exemplary steps.

At S100, the image-forming apparatus 10 may be powered on and started.

In one embodiment, after the image-forming apparatus 10 is powered on, the data control unit 101 and the engine control unit 102 may be powered on and started respectively.

In one embodiment, starting the engine control unit 102 may include powering on, verifying whether internal hardware and parts are failed, determining part configuration message, and initializing internal data.

At S101, the engine control unit 102 may complete startup.

It may be understood that the time needed for the engine control unit 102 to complete startup may be shorter than the time needed for the data control unit 101 to complete startup. Therefore, the engine control unit 102 may complete startup earlier than the data control unit 101.

At S102, after the engine control unit 102 completes startup in S101 and before the data control unit 101 completes startup in S201, the engine control unit 102 may determine whether a replacement event occurs in at least one process cartridge 100.

In one embodiment, after the engine control unit 102 completes startup, S102 may be performed to determine whether the replacement event occurs in at least one process cartridge 100.

In one embodiment, the quantity of process cartridges 100 may be one, such that the engine control unit 102 may determine whether the replacement event occurs in the one process cartridge 100. The quantity of process cartridges 100 may be multiple, such that the engine control unit 102 may determine whether the replacement event occurs in at least one of the multiple process cartridges 100.

In one embodiment, the replacement event of the process cartridge 100 may be that the process cartridge 100 of the image-forming apparatus 10 in which the process cartridge 100 is installed may have been replaced. When the process cartridge 100 after replacement in the image-forming apparatus 10 is different from the process cartridge 100 before replacement, it may determine that the replacement event occurs in the process cartridge 100. Exemplarily, the process cartridges 100A, 100B, 100C and 100D installed on the image-forming apparatus 10 may correspond to a process cartridge a, a process cartridge b, a process cartridge c and a process cartridge d, respectively. If the user of the image-forming apparatus 10 removes the process cartridge a, and then installs the process cartridge e, the process cartridge 100A may correspond to the process cartridge e. At this point, the image-forming apparatus 10 may determine that the replacement event occurs in the process cartridge 100 according to that the process cartridge e corresponding to the process cartridge 100A is different from the process cartridge a before replacement.

In other embodiments, the replacement event of the process cartridge 100 may also be that the process cartridge 100 is installed for the first time on the image-forming apparatus 10 which has not been installed with the process cartridge 100. Exemplarily, when the image-forming apparatus 10 is installed with the process cartridge 100 for the first time, it may determine that the replacement event occurs in the process cartridge 100.

In some embodiments, if the user of the image-forming apparatus 10 removes a certain process cartridge 100 installed on the image-forming apparatus 10 from the image-forming apparatus 10 and then installs same process cartridge 100 on the image-forming apparatus 10, the image-forming apparatus 10 may determine that no replacement event occurs in the process cartridge 100. Or, in other embodiments, the image-forming apparatus 10 may also determine that the replacement event occurs in the process cartridge 100.

In one embodiment, the replacement event occurs in the process cartridge 100 before the image-forming apparatus 10 is powered on, and whether the replacement event occurs in the process cartridge 100 may determine after the image-forming apparatus 10 is powered on.

Furthermore, when the process cartridge 100 installed on the image-forming apparatus 10 includes the drum cartridge and the developing cartridge mentioned above, both the drum cartridge and the developing cartridge may be respectively installed with process cartridge chips. Therefore, if above-mentioned replacement event occurs in any one of the drum cartridge and the developing cartridge in the process cartridge 100, it may determine that the replacement event occurs in the process cartridge 100.

At S103, before the data control unit 101 is started, the engine control unit 102 may further control the image-forming apparatus 10 to perform a preset image-forming preparation operation according to whether the replacement event occurs in at least one process cartridge obtained in S102.

In one embodiment, the engine control unit 102 may control the image-forming apparatus 10 to perform different preset image-forming preparation operations when the replacement event occurs in at least one process cartridge 100 and when the replacement event does not occur in at least one process cartridge 100.

As disclosed above, in the control method of the image-forming apparatus 10 provided in one embodiment, after successful startup, the engine control unit 102 of the image-forming apparatus 10 may determine whether the replacement event occurs in at least one process cartridge 100 and control the image-forming apparatus 10 to perform the preset image-forming preparation operation according to whether the replacement event occurs in at least one process cartridge 100. Since the startup time needed by the engine control unit 102 is relatively short, the engine control unit 102 may perform preparation operation more quickly after startup, which may reduce the time interval between powering on the image-forming apparatus 10 and subsequent printing processes. For example, the image-forming apparatus may perform the first page printing process as quickly as possible, thereby shortening the first page output time of the image-forming apparatus. When the user uses the image-forming apparatus 10, the user may obtain the image printed by the image-forming apparatus 10 more quickly after the image-forming apparatus 10 is powered on, thereby improving the user experience of the image-forming apparatus 10.

Exemplary Embodiment Two

Figure 3:
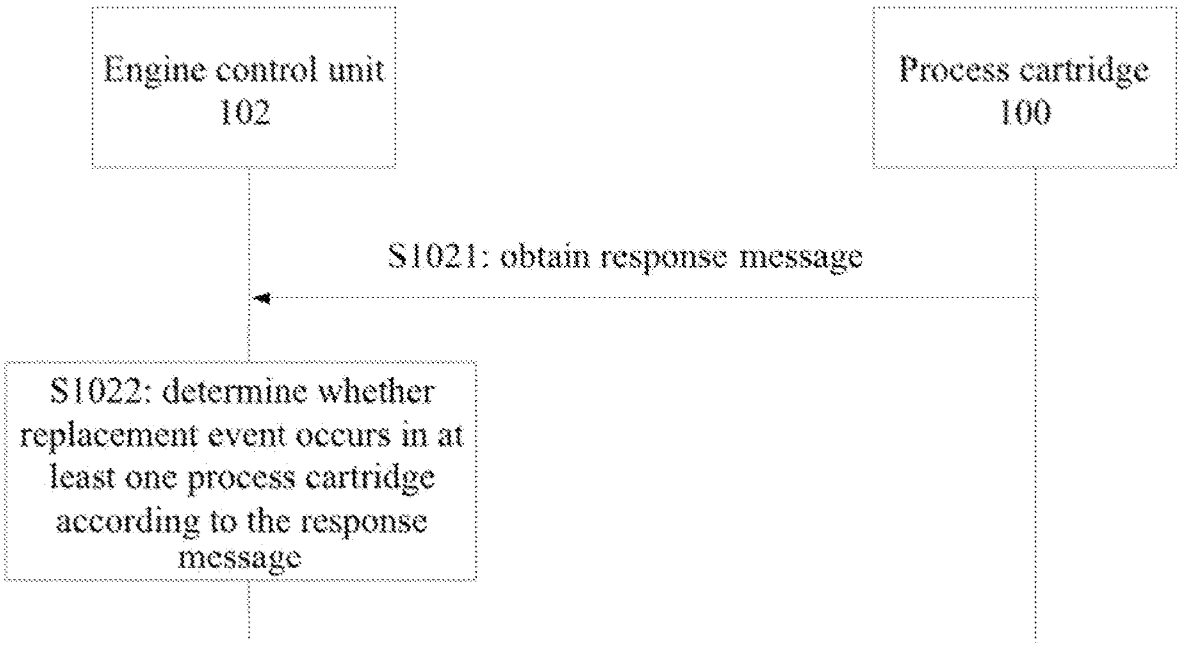
FIG. 3 illustrates another flowchart of a control method of an image-forming apparatus provided by exemplary embodiments of the present disclosure.

FIG. 3 illustrates another flowchart of a control method of an image-forming apparatus provided by exemplary embodiments of the present disclosure. FIG. 3 illustrates an implementation manner that the engine control unit 102 determines whether the replacement event occurs in at least one process cartridge 100 in S102 at exemplary embodiment one. The control method shown in FIG. 3 may include following exemplary steps.

At S1021, the engine control unit 102 may obtain a response message sent by the process cartridge chip of each process cartridge 100 in at least one process cartridge 100. The response message may be configured to indicate whether the replacement event occurs in the process cartridge 100.

In one embodiment, the response message sent by the process cartridge chip of each process cartridge 100 may include a binding message. In embodiments of the present disclosure, the binding message may be configured to represent the binding relationship formed between the image-forming apparatus 10 and the process cartridge 100 installed on the image-forming apparatus 10. For example, in an implementation manner, when the image-forming apparatus 10 is above-mentioned black and white printer, the quantity of installed process cartridges 100 may be 1, and the process cartridge 100 and the image-forming apparatus 10 may form a one-to-one binding relationship. For example, in another implementation manner, when the image-forming apparatus 10 is above-mentioned color printer, and the quantity of installed process cartridges 100 may be at least two, and the process cartridge 100 and the image-forming apparatus 10 may form a multiple-to-one binding relationship. For example, in an implementation manner, the binding message may be 8 bytes in length.

In one embodiment, the binding message may be a random number generated by the engine control unit 12 of the image-forming apparatus 10 according to a random number generation method when the image-forming apparatus 10 is bound to the process cartridge 100 and may be stored in the process cartridge chip of the process cartridge 100.

At S1022, the engine control unit 102 may determine whether the replacement event occurs in at least one process cartridge according to the response message sent by the process cartridge chip of each process cartridge 100 in at least one process cartridge 100.

The engine control unit 102 may determine whether the replacement event occurs in at least one process cartridge 100 according to the response message sent by the process cartridge chip of each process cartridge 100 in at least one process cartridge 100 obtained in S1021.

In one embodiment, the engine control unit 102 may determine the binding message of at least one process cartridge 100 according to the response message sent by the process cartridge chip of each process cartridge 100 in at least one process cartridge 100. In addition, according to the binding message of at least one process cartridge 100, whether the replacement event occurs in at least one process cartridge 100 may be determined.

Specific embodiments are used to describe the implementation manners of S1021 and S1022 in exemplary embodiment two.

Exemplary Embodiment Three

Figure 4:
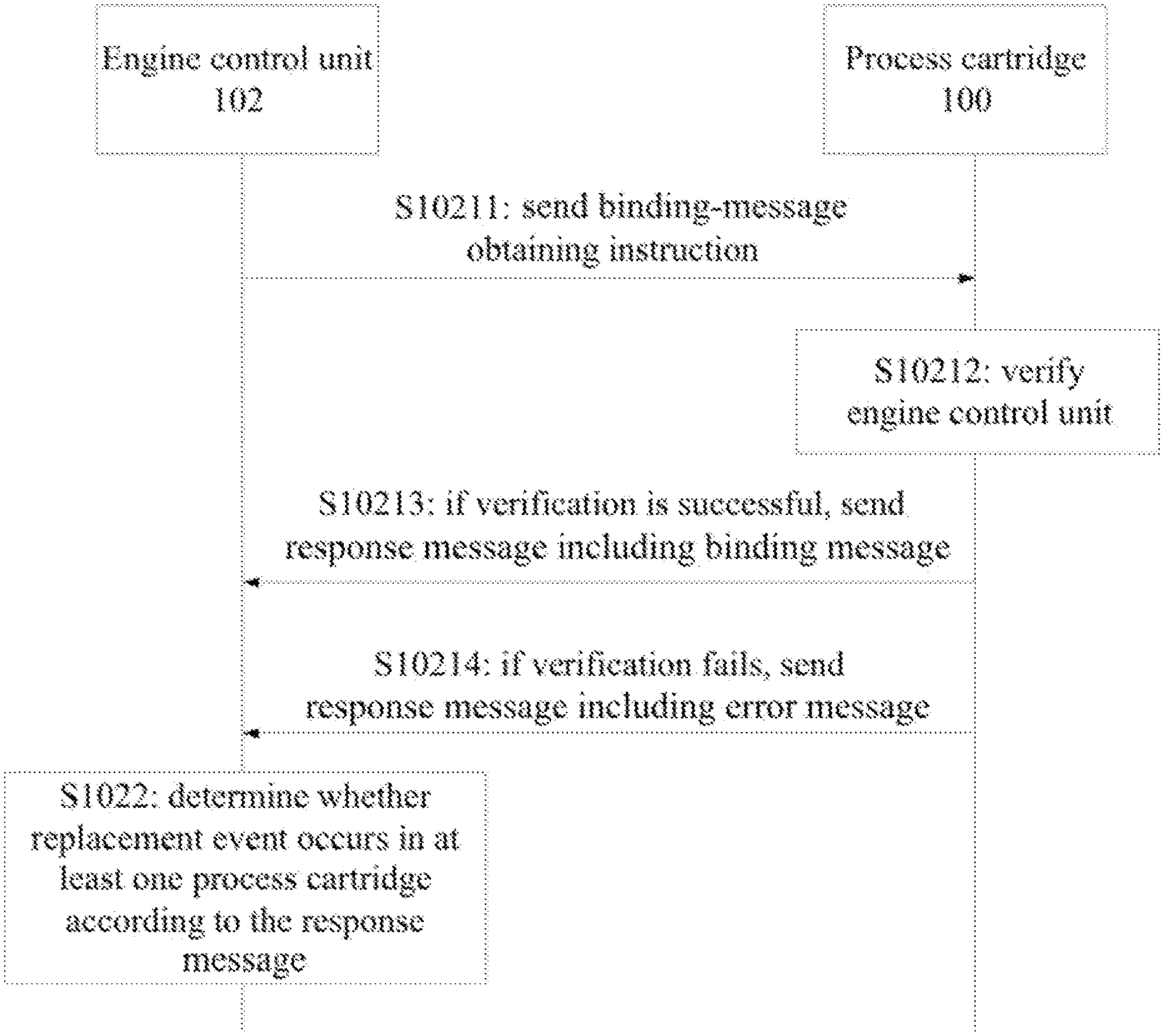
FIG. 4 illustrates another flowchart of a control method of an image-forming apparatus provided by exemplary embodiments of the present disclosure.

FIG. 4 illustrates another flowchart of a control method of an image-forming apparatus provided by exemplary embodiments of the present disclosure. FIG. 4 illustrates an implementation manner that the engine control unit 102 obtains the response message sent by the process cartridge chip of at least one process cartridge 100 in S1021 at exemplary embodiment two. The control method shown in FIG. 4 may include following exemplary steps.

At S10211, the engine control unit 102 may send a binding-message obtaining instruction to the process cartridge chip of each process cartridge 100 in at least one process cartridge 100.

In one embodiment, the binding-message obtaining instruction may further include a verification message corresponding to the engine control unit 102. For example, in an implementation manner, the verification message may be 8-byte characters or the like.

At S10212, the process cartridge chip of the process cartridge 100 may verify the engine control unit 102 according to received binding-message obtaining instruction. For example, the process cartridge chip of the process cartridge 100 may determine whether the binding-message obtaining instruction meets expectation.

In one embodiment, the process cartridge chip of the process cartridge 100 may verify the engine control unit 102 according to the verification message in the binding-message obtaining instruction. The response message may be then sent to the engine control unit according to the verification result of the engine control unit 102.

At S10213, when the process cartridge chip of the process cartridge 100 successfully verifies the engine control unit 102, the process cartridge chip of the process cartridge 100 may send the response message including the binding message to the engine control unit 102. The response message may include the binding message corresponding to the process cartridge 100.

In one embodiment, the engine control unit 102 may send the binding-message obtaining instruction to the process cartridge chip of each process cartridge 100 in at least one process cartridge 100 and receive the response message sent by the process cartridge chip of each process cartridge 100 in at least one process cartridge 100.

At S10214, when the process cartridge chip of the process cartridge 100 fails to verify the engine control unit 102, the process cartridge chip of the process cartridge 100 may send the response message including an error message to the engine control unit 102.

Exemplary Embodiment Four

Exemplary embodiment four of the present disclosure provides multiple manners for the engine control unit 102 to determine whether at least one process cartridge 100 has been replaced, which may be configured as the implementation manners of S1022 in exemplary embodiment two that the engine control unit 102 determines whether the replacement event occurs in at least one process cartridge according to the response message sent by the process cartridge chip of each process cartridge 100 in at least one process cartridge 100.

The first determination manner may be that the engine control unit 102 may determine whether received response message of at least one process cartridge 100 is valid. When the response message of at least one process cartridge 100 is invalid, it may determine that the replacement event occurs in at least one process cartridge 100.

Exemplarily, when the engine control unit 102 determines that there are more than 3 characters "0" or more than 3 characters "F" in the response message of the process cartridge 100, it may determine that the response message is invalid, and the replacement event occurs in the process cartridge 100.

In one embodiment, the response message may be verified through the following second manner, third manner or fourth manner to determine whether the replacement event occurs in the process cartridge 100.

The second determination manner may be that when the image-forming apparatus 10 includes one process cartridge 100, the engine control unit 102 may compare the response message sent by the process cartridge chip of the process cartridge 100 with a binding comparison message to obtain a comparison result. The binding comparison message may be pre-stored in the engine control unit 102. When the comparison result is "same" (that is, the response message is same as the binding comparison message), it may determine that the replacement event does not occur in one process cartridge 100. When the comparison result is that the response message is different from the binding comparison message, it may determine that the replacement event occurs in one process cartridge 100. In some embodiments, the engine control unit 102 may also first determine whether the response message returned by the process cartridge chip of the process cartridge 100 is valid; when the response message returned by the process cartridge chip of the process cartridge 100 is valid, the engine control unit 102 may compare the response message returned by the process cartridge 100 with the binding comparison message; and it may determine whether the replacement event occurs in one process cartridge 100 according to the comparison result.

The third determination manner may be that when the image-forming apparatus 10 includes multiple process cartridges 100, the engine control unit 102 may compare the response message sent by the process cartridge chip of each of the plurality of process cartridges 100 with the binding comparison message to obtain multiple comparison results. When each of multiple comparison results is "same" (that is, the response message is same as the binding comparison message) and multiple response messages are determined to be valid through the first manner, it may determine that the replacement event does not occur in at least one process cartridge 100. When each of multiple comparison results is that the response message is same as the binding comparison message and invalid response message in multiple response messages is determined through the first manner, it may determine that the replacement event occurs in at least one process cartridge 100. When at least one comparison result of multiple comparison results is "different" (that is, the response message is different from the binding comparison message), it may determine that the replacement event occurs in at least one process cartridge 100. In some embodiments, the engine control unit 102 may also first determine whether the response message returned by the process cartridge chip of the process cartridge 100 is valid; when the response message returned by the process cartridge 100 is valid, the response message returned by the process cartridge chip of the process cartridge 100 may be compared with the binding comparison message; and whether the replacement event occurs in at least one process cartridge 100 may be determined according to the comparison result. For example, four process cartridges 100 may be installed on the image-forming apparatus 10; the response messages returned by the process cartridge chips of all process cartridges 100 may be 0x2f, 0x2f, 0x4e and 0x2f, respectively; the engine control unit 102 may compare the response message with the binding comparison message 0x2f respectively, and obtained comparison result may be "same", "same", "different", and "same"; and it may determine that the replacement event occurs in at least one process cartridge 100 according to the third determination manner.

The fourth determination manner may be that when the image-forming apparatus 10 includes multiple process cartridges 100, the engine control unit 102 may compare multiple response messages sent by the process cartridge chip of each of the plurality of process cartridges 100 to obtain at least one comparison result. When at least one comparison result obtained is "same", it may determine whether the response message sent by the process cartridge chip of each of the plurality of process cartridges 100 is same as the binding comparison message. If the response message is same as the binding comparison message and multiple response messages are determined to be valid through the first manner, it may determine that the replacement event does not occur in at least one process cartridge 100. If the response message sent by the process cartridge chip of each of the multiple process cartridges 100 is same as the binding comparison message and invalid response message in multiple response messages is determined through the first manner, it may determine that the replacement event occurs in at least one process cartridge 100. When at least one comparison result obtained that the response message is same as the binding comparison message, it may determine that the replacement event occurs in at least one process cartridge 100. In some embodiments, the engine control unit 102 may also first determine whether the response message returned by the process cartridge chip of the process cartridge 100 is valid; when the response message returned by the process cartridge chip of the process cartridge 100 is valid, the engine control unit 102 may then compare multiple response messages; and whether the replacement event occurs in at least one process cartridge 100 may be determined according to the comparison result. Furthermore, it should be noted that the engine control unit 102 may compare multiple response messages sent by the process cartridge chip of each process cartridge 100 in the multiple process cartridges 100 to obtain at least one comparison result. For example, all multiple response messages may be directly compared to obtain one comparison result, or multiple response messages may be compared in pairs to obtain multiple comparison results and the like. For example, four process cartridges 100 may be installed on the image-forming apparatus 10, and the response messages returned by the process cartridge chips of all process cartridges 100 may be 0x2f, 0x2f, 0x4e, 0x2f, respectively. The engine control unit 102 may compare four response messages with the binding comparison message, and if the comparison results are not always "same", it may determine that the replacement event occurs in at least one process cartridge 100 according to the comparison results.

Exemplary Embodiment Five

In exemplary embodiment four, when the engine control unit 102 determines that the replacement event occurs in at least one process cartridge 100, the engine control unit 102 may generate and send a binding-message writing instruction to the process cartridge chip of the process cartridge 100.

For example, in one embodiment, when the replacement event occurs in at least one process cartridge 100 in the image-forming apparatus 10, the engine control unit 102 may generate the binding-message writing instruction. The binding-message writing instruction may include a second verification message and a first binding message. Subsequently, the engine control unit 102 may send the binding-message writing instruction to the process cartridge chip of at least one process cartridge 100 in the image-forming apparatus 10. After the process cartridge chip of each process cartridge 100 receives the binding-message writing message, the process cartridge chip of the process cartridge 100 may store the second verification message and the first binding message. In another embodiment, after the process cartridge chip of the process cartridge 100 receives the binding-message writing message, the second verification message and/or the first binding message may be stored in an external device connected to the process cartridge chip of the process cartridge 100. In another embodiment, binding-message writing message may include the first binding message; after the process cartridge chip of each process cartridge 100 receives the binding-message writing message, the process cartridge chip of the process cartridge 100 may store the first binding message; or the first binding message may be stored in an external device connected to the process cartridge chip of the process cartridge 100, and the second verification message may be pre-stored in the process cartridge chip of the process cartridge 100 or in an external device connected to the process cartridge chip of the process cartridge 100.

Therefore, when the first binding message and the second verification message are stored in the process cartridge chip of the process cartridge 100 or in an external device connected to the process cartridge chip of the process cartridge 100, after receiving the binding-message obtaining instruction sent by the engine control unit 102, the process cartridge chip of the process cartridge 100 may send the response message to the engine control unit 102. The response message may include the first binding message. For example, the binding-message obtaining instruction sent by the engine control unit 102 to the process cartridge chip of the process cartridge 100 may include the first verification message. After receiving the binding-message obtaining instruction, the process cartridge chip of the process cartridge 100 may determine whether the first verification message in the binding-message obtaining instruction is equal to the second verification message stored. If the first verification message is equal to the second verification message, the process cartridge chip of the process cartridge 100 may send the response message including the first binding message to the engine control unit 102. If the first verification message is not equal to the second verification message, the process cartridge chip of the process cartridge 100 may send the response message including the error message to the engine control unit 102.

In one embodiment, after the engine control unit 102 sends the binding-message writing instruction to the process cartridge chip installed on each process cartridge in at least one process cartridge 100, the process cartridge chip of the process cartridge 100, upon receiving the binding-message writing instruction, may send the verification response message to the engine control unit 102. The engine control unit 102 may determine whether the first binding message included in the binding-message writing instruction is correctly written into the process cartridge chip of the process cartridge 100 or into the external device connected to the process cartridge chip of the process cartridge 100. For example, after the process cartridge chip of the process cartridge 100 receives the binding-message writing instruction, the process cartridge chip of the process cartridge 100 may send the verification response message including the first binding message to the engine control unit 102 on its own, or after receiving the binding-message obtaining instruction sent by the engine control unit 102, send a response message based on the binding-message obtaining instruction. Furthermore, the binding-message obtaining instruction may include a third verification message, and the process cartridge chip of the process cartridge 100 may determine whether the third verification message is equal to the second verification message. If the third verification message is equal to the second verification message, the process cartridge chip of the process cartridge 100 may send the verification response message including the first binding information to the engine control unit 102; if the third verification message is not equal to the second verification message, the process cartridge chip of the process cartridge 100 may return the verification response message including the error message. Also, the process cartridge chip of the process cartridge 100 may respond directly to the binding-message obtaining instruction sent by the engine control unit 102 after receiving the binding-message obtaining instruction, and send the verification response message to the engine control unit 102; the engine control unit 102 may determine whether the first binding message included in the binding-message writing instruction is correctly written into the process cartridge chip of the process cartridge 100 or an external device connected to the process cartridge chip of the process cartridge 100 according to the verification response message. In another embodiment, after receiving the binding-message writing instruction and obtaining the first binding message and the second verification message, the process cartridge chip of the process cartridge 100 may not directly store such messages. Instead, at least one of the first binding message and the second verification message may be converted, and the first binding conversion message and the second verification conversion message after conversion may be stored.

For example, after the process cartridge chip of the process cartridge 100 receives the binding-message writing instruction sent by the engine control unit 102, according to the first preset rule, the first binding message in the binding-message writing instruction may be converted into the first binding conversion message; and according to the second preset rule, the second verification message in the binding-message writing instruction may be converted into the second verification conversion message. Finally, the process cartridge chip of the process cartridge 100 may store the first binding conversion message and the second verification conversion message according to the binding-message writing instruction.

Therefore, after the process cartridge chip of the process cartridge 100 receives the binding-message obtaining instruction sent by the engine control unit 102, stored second verification conversion message may be converted into the second verification message, and the process cartridge chip of the process cartridge 100 may determine whether the first verification message and the second verification message in the binding-message obtaining instruction are equal to each other. Subsequently, if the first verification message is equal to the second verification message, the process cartridge chip of the process cartridge 100 may convert the first binding conversion message into the first binding message and send the response message including the first binding message to the engine control unit 102. If the first verification message is not equal to the second verification message, the process cartridge chip of the process cartridge 100 may send the response message including the error message to the engine control unit 102.

For another example, after the process cartridge chip of the process cartridge 100 receives the binding-message writing instruction sent by the engine control unit 102, according to the first preset rule, the first binding message in the binding-message writing instruction may be converted into the first binding conversion message. Finally, the process cartridge chip of the process cartridge 100 may store the first binding conversion message and the second verification message according to the binding-message writing instruction. For example, the second verification message may be stored in the second preset storage apparatus according to the binding-message writing instruction, where the second preset storage apparatus may be disposed in the process cartridge chip, or in an external device connected to the process cartridge chip; and the first binding conversion message may be stored in the first preset storage apparatus according to the binding-message writing instruction, where the first preset storage apparatus may be disposed in the process cartridge chip, or in an external device connected to the process cartridge chip.

Therefore, after the process cartridge chip of the process cartridge 100 receives the binding-message obtaining instruction sent by the engine control unit 102, the process cartridge chip of the process cartridge 100 may determine whether the first verification message and the second verification message in the binding-message obtaining instruction are equal to each other. Subsequently, if the first verification message is equal to the second verification message, the process cartridge chip of the process cartridge 100 may convert the first binding conversion message into the first binding message and send the response message including the first binding message to the engine control unit 102. If the first verification message is not equal to the second verification message, the process cartridge chip of the process cartridge 100 may send the response message including the error message to the engine control unit 102.

For another example, after the process cartridge chip of the process cartridge 100 receives the binding-message writing instruction sent by the engine control unit 102, according to the second preset rule, the second verification message in the binding-message writing instruction may be converted into the second verification conversion message. Finally, the process cartridge chip of the process cartridge 100 may store the first binding message and the second verification conversion message according to the binding-message writing instruction. For example, the second verification conversion message may be stored in the second preset storage apparatus according to the binding-message writing instruction, where the second preset storage apparatus may be disposed in the process cartridge chip, or in an external device connected to the process cartridge chip; and the first binding message may be stored in the first preset storage apparatus according to the binding-message writing instruction, where the first preset storage apparatus may be disposed in the process cartridge chip, or in an external device connected to the process cartridge chip.

In one embodiment, after the process cartridge chip of the process cartridge 100 receives the binding-message obtaining instruction sent by the engine control unit 102, stored second verification conversion message may be converted into the second verification message, and the process cartridge chip of the process cartridge 100 may determine whether the first verification message and the second verification message in the binding-message obtaining instruction are equal to each other. Subsequently, if the first verification message is equal to the second verification message, the process cartridge chip of the process cartridge 100 may send the response message including the first binding message to the engine control unit 102. If the first verification message is not equal to the second verification message, the process cartridge chip of the process cartridge 100 may send the response message including the error message to the engine control unit 102.

In another embodiment, after the process cartridge chip of the process cartridge 100 receives the binding-message obtaining instruction sent by the engine control unit 102, the first verification message in the binding-message obtaining instruction may be converted into the first verification conversion message according to the second preset rule, and the process cartridge chip of the process cartridge 100 may determine whether the first verification conversion message and the second verification conversion message are equal to each other. Subsequently, if the first verification conversion message is equal to the second verification conversion message, the process cartridge chip of the process cartridge 100 may send the response message including the first binding message to the engine control unit 102. If the first verification conversion message is not equal to the second verification conversion message, the process cartridge chip of the process cartridge 100 may send the response message including the error message to the engine control unit 102.

Exemplary Embodiment Six

In exemplary embodiment four, when the engine control unit 102 determines that the replacement event occurs in at least one process cartridge 100, the engine control unit 102 may generate the binding-message writing instruction and send the binding-message writing instruction to the process cartridge chip of the process cartridge 100.

For example, in one embodiment, when the replacement event occurs in at least one process cartridge 100 of the image-forming apparatus 10, the engine control unit 102 may generate the binding-message writing instruction. The binding-message writing instruction may include the first binding message. Subsequently, the engine control unit 102 may send the binding-message writing instruction to the process cartridge chip of at least one process cartridge 100 in the image-forming apparatus 10. Each process cartridge chip may store the first binding message upon receiving the binding-message writing instruction. In another embodiment, after the process cartridge chip of the process cartridge 100 receives the binding-message writing instruction, the process cartridge chip of the process cartridge 100 may store the first binding message in an external device connected to the process cartridge chip. The process cartridge chip of the process cartridge 100 or the external device connected to the process cartridge chip of the process cartridge 100 may pre-store the second verification information.

Therefore, when the first binding message and the second verification information are stored in the process cartridge chip of the process cartridge 100 or in the external device connected to the process cartridge chip, upon receiving the binding-message obtaining instruction sent by the engine control unit 102, the process cartridge chip of the process cartridge 100 may send the response message to the engine control unit 102. The response message may include the first binding message. For example, the binding-message obtaining instruction sent by the engine control unit 102 to the process cartridge chip may include the first verification information. After receiving the binding-message obtaining instruction, the process cartridge chip of the process cartridge 100 may determine whether the first verification information in the instruction is equal to stored second verification information. When the first verification information is equal to the second verification information, the process cartridge chip may send the response message including the first binding message to the engine control unit 102. When the first verification information is not equal to the second verification information, the process cartridge chip may send the response message including the error message to the engine control unit 102.

It should be noted that the process cartridge chip of the process cartridge 100 or the external device connected to the process cartridge chip of the process cartridge 100 may also pre-store the second verification conversion message. The second verification conversion message may be obtained by converting the second verification information according to the second preset rule. Subsequently, after the process cartridge chip of the process cartridge 100 receives the binding-message obtaining instruction including the first verification information from the engine control unit 102, the binding-message obtaining instruction may be proceeded in one of the following two implementation manners.

For implementation manner one, the process cartridge chip may convert the stored second verification conversion message into the second verification information and determine whether the first verification information in the binding-message obtaining instruction is equal to the second verification information. Subsequently, if the first verification information is equal to the second verification information, the process cartridge chip of the process cartridge 100 may convert the first binding transformation information into the first binding message and send the response message including the first binding message to the engine control unit 102. If the first verification information is not equal to the second verification information, the process cartridge chip of the process cartridge 100 may send the response message including the error message to the engine control unit 102.

For implementation manner two, the process cartridge chip may convert the first verification information in the binding-message obtaining instruction into the first verification conversion message according to the second preset rule and determine whether the first verification conversion message is equal to the second verification conversion message. Subsequently, if the first verification conversion message is equal to the second verification conversion message, the process cartridge chip of the process cartridge 100 may send the response message including the first binding message to the engine control unit 102. If the first verification conversion message is not equal to the second verification conversion message, the process cartridge chip of the process cartridge 100 may send the response message including an error message.

In one embodiment, when the engine control unit 102 sends the binding-message writing instruction to each process cartridge chip installed on at least one process cartridge 100, and after the process cartridge chip of the process cartridge 100 receives the binding-message writing instruction, the process cartridge chip of the process cartridge 100 may send the verification response message to the engine control unit 102. The engine control unit 102 may determine whether the first binding message included in the binding-message writing instruction is correctly written into the process cartridge chip of the process cartridge 100 or the external device connected to the process cartridge chip of the process cartridge 100. For example, after receiving the binding-message writing instruction, the process cartridge chip may either send the verification response message including the first binding message to the engine control unit 102 on its own or may send the verification response message to the engine control unit 102 based on the binding verification read instruction sent by the engine control unit 102. Furthermore, the binding verification read instruction may include the third verification information, and the process cartridge chip may determine whether the third verification information is equal to the second verification information. If the third verification information is equal to the second verification information, the process cartridge chip may send the verification response message including the first binding message to the engine control unit 102. If the third verification information is not equal to the second verification information, the process cartridge chip may return the verification response message including the error message. Obviously, the process cartridge chip of the process cartridge 100 may also respond directly to the binding verification read instruction sent by the engine control unit 102 and send the verification response message. The engine control unit 102 may determine whether the first binding message included in the binding-message writing instruction is correctly written into the process cartridge chip of the process cartridge 100 or the external device connected to the process cartridge chip of the process cartridge 100 according to the verification response message sent by the process cartridge chip of the process cartridge 100.

In another embodiment, after the process cartridge chip of the process cartridge 100 receives the binding-message writing instruction and obtains the first binding message, the process cartridge chip of the process cartridge 100 may not store the first binding message directly but instead process and store the converted first binding transformation information.

For example, after the process cartridge chip of the process cartridge 100 receives the binding-message writing instruction from the engine control unit 102, the process cartridge chip of the process cartridge 100 may convert the first binding message in the binding-message writing instruction into the first binding conversion message according to the first preset rule. Finally, the process cartridge chip may store the first binding conversion information based on the binding-message writing instruction. For example, the first binding transformation information may be stored in the first preset storage apparatus, where the first preset storage apparatus may be configured in the process cartridge chip, or in the external device connected to the process cartridge chip.

After the process cartridge chip receives the binding-message obtaining instruction from the engine control unit 102, the process cartridge chip may determine whether the first verification information in the binding-message obtaining instruction is equal to the second verification information. Subsequently, if the first verification information is equal to the second verification information, the process cartridge chip of the process cartridge 100 may convert the first binding conversion message into the first binding message and send the response message including the first binding message to the engine control unit 102. If the first verification information is not equal to the second verification information, the process cartridge chip of the process cartridge 100 may send the response message including the error message to the engine control unit 102.

Exemplary Embodiment Seven

In exemplary embodiment one as shown in FIG. 2, step S103 of the engine control unit 102 controlling the image-forming apparatus 10 to perform the preset image-forming preparation operation according to whether the replacement event occurs in at least one process cartridge 100 may include that when the replacement event does not occur in at least one process cartridge 100, the engine control unit 102 may control the image-forming apparatus 10 to perform the first image-forming preparation operation.

In one embodiment, after the engine control unit 102 controls the image-forming apparatus 10 to perform the first image-forming preparation operation, when the image-forming data is received, the engine control unit 102 may control the image-forming apparatus 10 to execute the printing process according to the image-forming data. That is, once the image-forming apparatus 10 completes execution of the first image-forming preparation operation, the image-forming apparatus 10 may immediately execute the image-forming operation.

In one embodiment, the first image-forming preparation operation may include printing setting data, cleaning the transfer belt, increasing the fixing temperature to a suitable temperature, turning on the motor in advance and waiting for the rotation speed to be stabilized, moving paper to a designated position in advance, and the like. After the engine control unit 102 controls the image-forming apparatus 10 to execute the printing preparation process, that is, after completing execution of the first image-forming preparation process, the process of waiting for sending the print data may be executed. Subsequently, once the engine control unit 102 receives the print data, printing may be started immediately within a short period of time.

In one embodiment, after the data control unit 101 completes startup in S201, the engine control unit 102 may also determine whether at least one process cartridge 100 matches the image-forming apparatus 10 and determine whether the replacement event occurs in at least one process cartridge 100. When at least one process cartridge 100 matches the image-forming apparatus 10 and the replacement event occurs in at least one process cartridge 100, the engine control unit 102 may also obtain the remaining amount of developer corresponding to the process cartridge 100. Subsequently, when the remaining amount of developer is lower than a preset value, the engine control unit 102 may determine that there is no need to perform a color correction operation; and when the remaining amount of developer is not lower than the preset value, the engine control unit 102 may determine that the color correction operation is needed. When at least one process cartridge 100 matches the image-forming apparatus 10 and no replacement event occurs in at least one process cartridge 100, the engine control unit 102 may control the image-forming apparatus 10 to enter a state of waiting for receiving the image-forming data. Methods for how the engine control unit 102 determines whether at least one process cartridge 100 matches the image-forming apparatus 10 and whether the replacement event occurs in at least one process cartridge 100 after the data control unit 101 completes startup are introduced in subsequent embodiments in the present disclosure.

When the replacement event occurs in at least one process cartridge 100 and the image-forming apparatus 10 includes one process cartridge 100, the engine control unit 102 may control the image-forming apparatus 10 not to perform the first image-forming preparation operation. The engine control unit 102 may directly control the image-forming apparatus 10 to perform the printing process.

In one embodiment, after the data control unit 101 completes startup in S201, the engine control unit 102 may also determine whether at least one process cartridge 100 matches the image-forming apparatus 10 and determine whether the replacement event occurs in at least one process cartridge 100. When at least one process cartridge 100 matches the image-forming apparatus 10 and the replacement event occurs in at least one process cartridge 100, the engine control unit 102 may also obtain the remaining amount of developer corresponding to the process cartridge 100. Subsequently, when the remaining amount of the developer is lower than the preset value, the engine control unit 102 may determine that the color correction operation is not needed; when the remaining amount of the developer is not lower than the preset value, the engine control unit 102 may determine that the color correction operation is needed.

When the replacement event occurs in at least one process cartridge 100 and the image-forming apparatus 10 includes the plurality of process cartridges 100, the engine control unit 102 may control the image-forming apparatus 10 to perform the second image-forming preparation operation including a color correction preparation process.

In one embodiment, the second image-forming preparation operation may include performing the color correction preparation process.

For example, when the replacement occurs in the process cartridge 100, the gap between the process cartridge 100 and the image-forming apparatus 10 may physically shift, which may cause offset in the image formed by the image-forming apparatus 10. Therefore, when the replacement event occurs in the process cartridge 100, the engine control unit 102 may correct the internal data of the image-forming apparatus 10 through the color correction preparation process, such that the color registration of the printed image may be realigned, and the offset between the process cartridge 100 and the image-forming apparatus 10 may be eliminated.

In one embodiment, the color correction preparation process may include loading the color correction data and cleaning the transfer belt in the image-forming apparatus 10. After completing the color correction preparation process, once the color correction operation is determined to be needed, the color correction operation may be started immediately within a short period of time.

In another embodiment, the process cartridge 100 may include the developer accommodating portion and the image-forming assembly that are cooperated with each other, as mentioned above. Optionally, the second image-forming preparation operation may further include resetting a control voltage of a density sensor, that is, the voltage gain of the density sensor.

For example, the image-forming apparatus may be configured with the density sensor; the density sensor may be configured to detect the mass ratio of the toner and a carrier (e.g., iron oxide) to obtain an output voltage; and the output voltage may be configured to characterize the mass ratio relationship between the toner and the carrier. The operation of resetting the control voltage of the density sensor may be that the engine control unit 102 may read the density sensor's control voltage recorded on the process cartridge chip and configure the control voltage to the density sensor. One process cartridge chip may only record the density sensor's control voltage of the color corresponding to the process cartridge. After the engine control unit 102 resets the density sensor's control voltage, the density sensor's control voltage that matches the process cartridge 100 after the replacement event occurs may be obtained.

Optionally, the second image-forming preparation operation may further include clearing a calculation parameter of a target voltage for toner supply control in the engine control unit 102.

For example, the target voltage for toner supply control may be defined as a desirable output level of the output voltage of the density sensor under the standard ratio relationship between the toner and the carrier. The target voltage for toner supply control may be determined by following parameters, that is, corresponding parameters of the target voltage for toner supply control may include a lifespan correction parameter, a target voltage correction parameter, and/or a color correction target coefficient parameter. Obviously, those skilled in the art may also select other target voltage-related parameters for toner supply control according to actual conditions.

Optionally, the second image-forming preparation operation may further include applying a relatively long-time stirring action to the toner and the carrier in the image-forming assembly.

For example, a developing chamber of the image-forming assembly may be configured with a threaded rod for stirring the toner. Applying the relatively long-time stirring action may include, for example, driving a main motor to rotate and driving above-mentioned threaded rod to apply the stirring action with a time length of t3 to the toner and the carrier in the image-forming assembly, which may prevent the toner and the carrier from being agglomerated, make the toner and the carrier frictionally charged, and evenly distribute the toner and the carrier in the developer convey channel.

It should be noted that when the process cartridge replacement event does not occur, a relatively short-time stirring action may be applied to the toner and the carrier in the image-forming assembly. That is, a stirring action of a time length of t4 may be applied to the toner and the carrier in the image-forming component, and t3 may be greater than t4.

In one embodiment, the printing process may further include the first image-forming preparation process. The first image formation preparation process may include printing setting data, cleaning the transfer belt, increasing the fixing temperature to a suitable temperature, starting the motor in advance and waiting for the rotation speed to be stabilized, moving the paper to a designated position in advance, applying the relatively short-time stirring action to the toner and the carrier in the image-forming assembly, and the like. Once the printing preparation process is completed, that is, after the engine control unit 102 controls the image-forming apparatus 10 to complete the execution of the first image-forming preparation process, printing may be started immediately after receiving the print data within a short period of time.

Exemplary Embodiment Eight

In exemplary embodiment one as shown in FIG. 2, after the data control unit 101 completes startup in S201, the engine control unit 102 may also determine whether at least one process cartridge 100 matches the image-forming apparatus 10. The engine control unit 102 may perform subsequent operations when the engine control unit 102 determines that at least one process cartridge 100 matches the image-forming apparatus 10. When the engine control unit 102 determines that at least one process cartridge 100 does not match the image-forming apparatus 10, an error may be reported.

Figure 5:
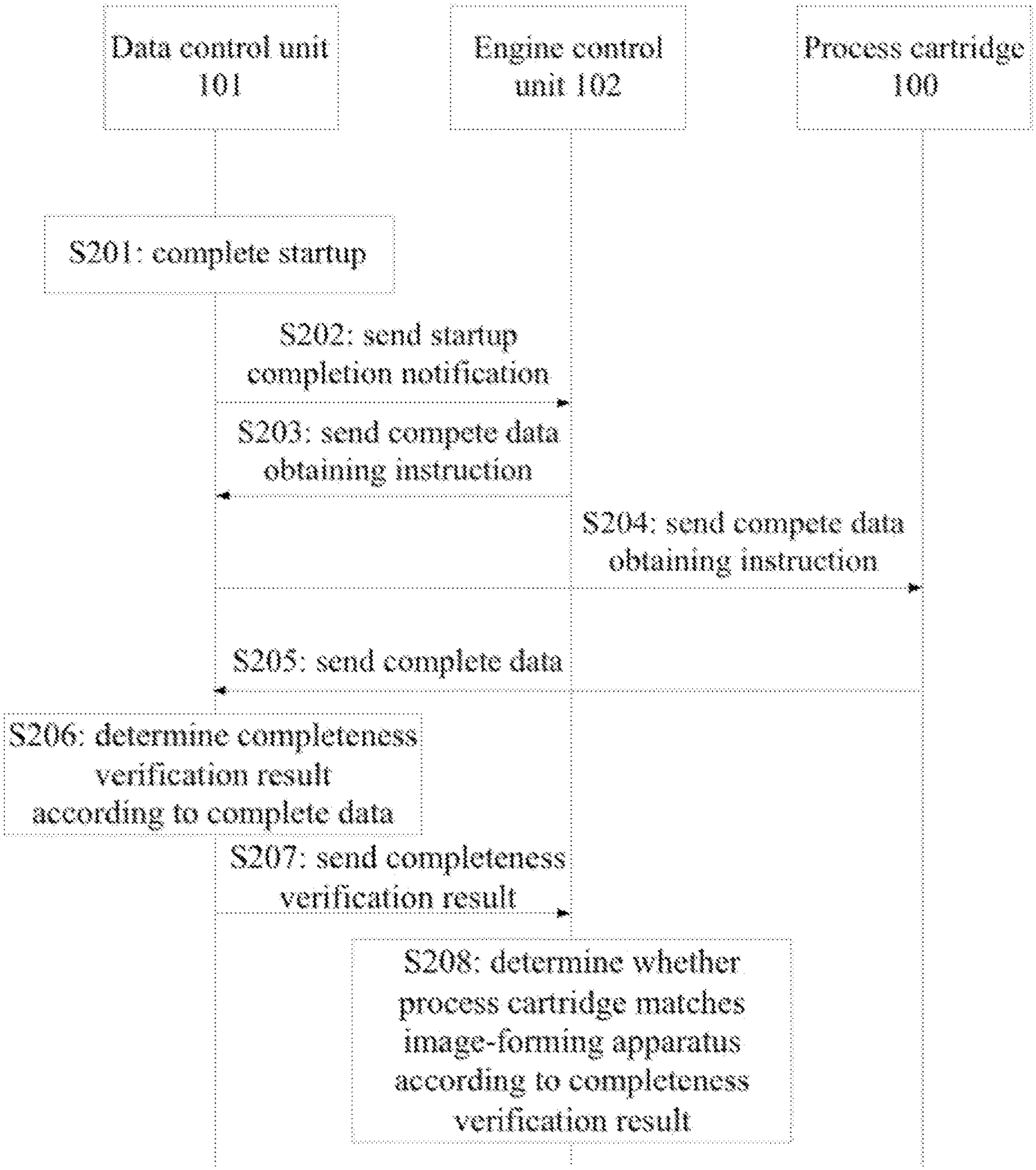
FIG. 5 illustrates another flowchart of a control method of an image-forming apparatus provided by exemplary embodiments of the present disclosure.

In one embodiment, FIG. 5 illustrates another flowchart of a control method of an image-forming apparatus provided by exemplary embodiments of the present disclosure. FIG. 5 illustrates an implementation manner that the engine control unit 102 determines whether at least one process cartridge 100 matches the image-forming apparatus 10. The control method shown in FIG. 5 may include following exemplary steps.

At S201, the data control unit 101 may complete startup.

At S202, after completing the startup in S201, the data control unit 101 may send a startup completion notification to the engine control unit 102.

At S203, after receiving the startup completion notification, the engine control unit 102 may send a complete data obtaining instruction to the data control unit 101.

At S204, after receiving the complete data obtaining instruction, the data control unit 101 may send the complete data obtaining instruction to at least one process cartridge 100.

At S205, after receiving the complete data obtaining instruction, each process cartridge 100 in at least one process cartridge 100 may send complete data corresponding to the process cartridge chip of the process cartridge 100 to the data control unit 101 according to the complete data obtaining instruction.

In one embodiment, the complete data may include a design capacity, a remaining capacity, a serial number, a color message, a manufacturer message, a model message, a binding message and the like of the process cartridge 100.

At S206, according to received complete data sent by the process cartridge chip of each process cartridge 100 in at least one process cartridge 100 in S205, the data control unit 101 may respectively verify the complete data of the process cartridge chip of each process cartridge 100 in at least one process cartridge 100 to obtain a completeness verification result of the process cartridge chips of at least one process cartridge 100.

At S207, the data control unit 101 may send at least a part of the completeness verification result of the process cartridge chip installed on each process cartridge of at least one process cartridge 100 to the engine control unit 102; and/or the data control unit 101 may send at least a part of complete data of the process cartridge chip installed on each process cartridge of at least one process cartridge 100 to the engine control unit 102.

At S208, the engine control unit 102 may determine whether at least one process cartridge 100 matches the image-forming apparatus according to at least a part of the completeness verification result and at least part of the complete data received in S207; and/or the engine control unit 102 may determine whether the replacement event occurs in at least one process cartridge 100 according to at least a part of the completeness verification result and at least part of the complete data received in S20.

In one embodiment, whether at least one process cartridge 100 matches the image-forming apparatus may be determined by evaluating whether the data structure of at least a part of received complete data of the process cartridge chip of at least one process cartridge 100 meets the requirements of the image-forming apparatus 10. Exemplarily, a serial number for the image-forming apparatus 10 to represent the process cartridge 100 may be 8-bit data; and a feedback serial number for the process cartridge 100 to represent the process cartridge chip may be 4-bit data. At this point, it may determine that the process cartridge 100 does not match the image-forming apparatus 10.

In one embodiment, whether at least one process cartridge matches the image-forming apparatus 10 may be determined by evaluating whether an attribute corresponding to received process cartridge chip of at least one process cartridge 100 meet expectation. For example, when the manufacturer identification data of the image-forming apparatus 10 indicates a manufacturer A and the manufacturer identification data of the process cartridge chip of the process cartridge 100 indicates a manufacturer B, it may determine that the process cartridge 100 and the image-forming apparatus 10 are not matched with each other.

In one embodiment, whether at least one process cartridge 100 matches the image-forming apparatus 10 may determine by evaluating whether a received placement position of at least one process cartridge 100 in the image-forming apparatus 10 meets expectation. For example, when it determines that the color identification data of the process cartridge chip of the process cartridge 100 indicates the black K, but the channel where the process cartridge 100 is placed is the cyan C, that is, the process cartridge 100 is placed on the wrong channel of the image-forming apparatus 10, it may determine that the process cartridge 100 and the image-forming apparatus 10 are not matched with each other.

In one embodiment, other message may also be configured to determine whether at least one process cartridge 100 matches the image-forming apparatus 10. For example, when the user ID (identification) data of the image-forming apparatus 10 indicates A and the user ID (identification) data of the process cartridge chip of the process cartridge 100 indicates B, it may determine that the process cartridge 100 and the image-forming apparatus 10 are not matched with each other.

In one embodiment, determining whether the replacement event occurs in at least one process cartridge 100 by evaluating received complete data of the process cartridge chip of at least one process cartridge 100 may include that the determination result of whether the replacement event occurs in the process cartridge 100 before the data control unit 101 completes startup may be determined; if the determination result is that the replacement event occurs in the process cartridge 100 before the data control unit 101 completes startup, it may determine that the replacement event occurs in the process cartridge 100; and if the determination result is that the replacement event does not occur in the process cartridge 100 before the data control unit 101 completes startup, it may determine whether the replacement event occurs in the process cartridge 100 according to the binding message introduced in above-mentioned embodiments, which may not be described in detail herein.

Exemplary Embodiment Nine

Embodiments of the present disclosure further provide a process cartridge chip. The process cartridge chip may be installed on the process cartridge 100 provided in any embodiments of the present disclosure. The process cartridge 100 may be detachably installed on the image-forming apparatus 10. The process cartridge chip may include a control unit; and the control unit may be configured to run the control method executed by the process cartridge chip in any embodiments of the present disclosure.

Embodiments of the present disclosure further provide a process cartridge chip which is installed on the process cartridge 100 provided in any embodiments of the present disclosure. The process cartridge 100 may be installed on the image-forming apparatus 10 provided in any embodiments of the present disclosure, and at least one process cartridge 100 may be installed on the image-forming apparatus 10. The image-forming apparatus 10 may include a data control unit 101 and an engine control unit 102. Each of the process cartridge chips may communicate with the data control unit 101 and the engine control unit 102, respectively.

For example, the process cartridge chip may include a communication interface and a control unit. The communication interface may be configured as the following. When the process cartridge 100 is installed on the image-forming apparatus 10, the process cartridge chip may communicate with the data control unit 101 and the engine control unit 102 through the communication interface respectively.

The control unit may be configured to send the response message to the engine control unit 102 after the engine control unit 102 completes startup and before the data control unit 101 completes startup. The response message may be configured to determine whether the replacement event occurs in at least one process cartridge 100. The determination result of whether the replacement event occurs in at least one process cartridge 100 may be configured to determine whether the preset image-forming preparation operation is performed before the data control unit 101 completes startup. How the determination result is configured to determine whether the replacement event occurs in at least one process cartridge 100 refers to above-mentioned embodiments.

In one embodiment, the control unit may be configured to receive the binding-message obtaining instruction sent by the engine control unit 102 after the engine control unit 102 completes startup and before the data control unit 101 completes startup. The binding-message obtaining instruction may include the first verification message. When the verification of the binding-message obtaining instruction is passed according to the first verification message, the preset binding message may be obtained, and the response message containing the preset binding message may be sent to the engine control unit 102. However, when the verification of the binding-message obtaining instruction fails according to the first verification message, the response message including the error message may be sent to the engine control unit 102. The response message may be configured to determine whether the replacement event occurs in at least one process cartridge after the engine control unit 102 is started and before the data control unit 101 is started. The determination result of whether the replacement event occurs in at least one process cartridge may be configured to determine whether the preset image-forming preparation operation is performed before the data control unit 101 completes startup. It should be noted that the preset binding message may be same as the binding message stored in the first preset storage apparatus and may also be converted message obtained by converting the binding message stored in the first preset storage apparatus according to a preset rule.

In one embodiment, the control unit may be configured to receive the binding-message writing instruction including the first binding message; and the first binding conversion message may be stored in the first preset storage apparatus according to the binding-message writing instruction.

In one embodiment, the first preset storage apparatus may pre-store the second verification information or the second verification conversion message.

In one embodiment, the control unit may be configured to obtain the second verification message; after the engine control unit 102 completes startup and before the data control unit 101 completes startup, the binding-message obtaining instruction sent by the engine control unit 102 may be received; the binding-message obtaining instruction may include the first verification message; if the first verification message is equal to the second verification message, the first binding message may be obtained, and the response message including the first binding message may be sent to the engine control unit 102; and if the first verification message is not equal to the second verification message, the response message including the error message may be sent to the engine control unit 102. The first binding message may be stored in the first preset storage apparatus, and the second verification message may be stored in the second preset storage apparatus.

The control unit may be further configured to receive the binding-message writing instruction including the first binding message and the second verification message; store the second verification message in the second preset storage apparatus according to the binding-message writing instruction; and store the first binding message in the first preset storage apparatus according to the binding-message writing instruction.

In one embodiment, the control unit may be configured to obtain the second verification message; after the engine control unit 102 completes startup and before the data control unit 101 completes startup, the binding-message obtaining instruction sent by the engine control unit 102 may be received; the binding-message obtaining instruction may include the first verification message; if the first verification message is equal to the second verification message, the first binding conversion message may be obtained, and the response message including the first binding message obtained by converting the first binding conversion message according to the first preset rule may be sent to the engine control unit 102; and if the first verification message is not equal to the second verification message, the response message including the error message may be sent to the engine control unit 102. The first binding conversion message may be stored in the first preset storage apparatus, and the second verification message may be stored in the second preset storage apparatus.

The control unit may be further configured to receive the binding-message writing instruction including the first binding message and the second verification message, convert the first binding message according to the first preset rule to obtain the first binding conversion message, store the second verification message in the second preset storage apparatus according to the binding-message writing instruction, and store the first binding conversion message in the first preset storage apparatus according to the binding-message writing instruction.

In one embodiment, the control unit may be configured to obtain the second verification conversion message; after the engine control unit 102 completes startup and before the data control unit 101 completes startup, the binding-message obtaining instruction sent by the engine control unit 102 may be received, where the binding-message obtaining instruction may include the first verification message; the second verification conversion message may be converted into the second verification message according to the fourth preset rule; if the second verification message is equal to the first verification message, the first binding conversion message may be obtained and the response message including the first binding message obtained by converting the first binding conversion message according to the third preset rule may be sent to the engine control unit 102; and if the second verification message is not equal to the first verification message, the response message including the error message may be sent to the engine control unit 102. Or the control unit may be configured to obtain the second verification conversion message from the second preset storage apparatus; after the engine control unit 102 completes startup and before the data control unit 101 completes startup, the binding-message obtaining instruction sent by the engine control unit 102 may be received, where the binding-message obtaining instruction may include the first verification message; the first verification message may be converted into first verification conversion message according to the second preset rule; if the second verification conversion message is equal to the first verification conversion message, the response message including the first binding message obtained by converting the first binding conversion message according to the third preset rule may be sent to the engine control unit 102; and if the second verification conversion message is not equal to the first verification conversion message, the response message including the error message may be sent to the engine control unit 102. The first binding conversion message may be stored in the first preset storage apparatus, and the second verification conversion message may be stored in the second preset storage apparatus.

The control unit may be further configured to receive the binding-message writing instruction including the first binding message and the second verification message; the first binding message may be converted according to the first preset rule to obtain the first binding conversion message; the second verification message may be converted according to the second preset rule to obtain the second verification conversion message; the second verification conversion message may be stored in the second preset storage apparatus according to the binding-message writing instruction; and the first binding conversion message may be stored in the first preset storage apparatus according to the binding-message writing instruction.

In one embodiment, the control unit may be configured to obtain the second verification conversion message; after the engine control unit 102 completes startup and before the data control unit 101 completes startup, the binding-message obtaining instruction sent by the engine control unit 102 may be received, where the binding-message obtaining instruction may include the first verification message; the second verification conversion message may be converted into the second verification message according to the fourth preset rule; if the second verification message is equal to the first verification message, the first binding message may be obtained, and the response message including the first binding message may be sent to the engine control unit 102; and if the second verification message is not equal to the first verification message, the response message including the error message may be sent to the engine control unit 102. Or the control unit may be configured to obtain the second verification conversion message from the second preset storage apparatus; after the engine control unit 102 completes startup and before the data control unit 101 completes startup, the binding-message obtaining instruction sent by the engine control unit 102 may be received, where the binding-message obtaining instruction may include the first verification message; the first verification message may be converted into first verification conversion message according to the second preset rule; if the second verification conversion message is equal to the first verification conversion message, the first binding message may be obtained, and the response message including the first binding message may be sent to the engine control unit 102; and if the second verification conversion message is not equal to the first verification conversion message, the response message including error message may be sent to the engine control unit 102. The first binding message may be stored in the first preset storage apparatus, and the second verification conversion message may be stored in the second preset storage apparatus.

The control unit may be further configured to receive the binding-message writing instruction including the first binding message and the second verification message; the second verification message may be converted according to the second preset rule to obtain the second verification conversion message; the second verification conversion message may be stored in the second preset storage apparatus according to the binding-message writing instruction; and the first binding message may be stored in the first preset storage apparatus according to the binding-message writing instruction.

In one embodiment, the control unit may be further configured to send the verification response message to the engine control unit 102 after receiving the binding-message writing instruction, the verification response information may be configured to determine whether the first binding message included in the binding-message writing instruction is correctly written into the process cartridge chip.

In one embodiment, the control unit may be further configured to receive the binding-verification reading instruction including the third verification message after receiving the binding-message writing instruction; the verification response message may be fed back to the engine control unit 102 according to the binding-verification reading instruction; and the verification response message may be configured to determine whether the first binding message in the binding-message writing instruction is correctly written into the process cartridge chip. It should be noted that above-mentioned first preset storage apparatus may be disposed in the process cartridge chip, or in an external device connected to the process cartridge chip; and above-mentioned second preset storage apparatus may be disposed in the process cartridge chip, or in an external device connected to the process cartridge chip. The first preset storage apparatus and the second preset storage apparatus mentioned above may be same or different. The first preset storage apparatus and the second preset storage apparatus may be, for example, a storage unit or two different storage units disposed in the process cartridge chip, or a storage unit or two different storage units disposed in an external device connected to the process cartridge chip. Or the first preset storage apparatus and the second preset storage apparatus may be two storage units respectively disposed on the process cartridge chip and an external device connected to the process cartridge chip; that is, one storage apparatus may be disposed in the process cartridge chip, and another one storage apparatus may be disposed in an external device connected to the process cartridge chip.

In one embodiment, the control unit may be configured to receive the complete data obtaining instruction from the process cartridge chip and send complete data to the data control unit 101 according to the complete data obtaining instruction. The complete data may be configured to determine whether at least one process cartridge matches the image-forming apparatus after the data control unit 101 completes startup; and/or the complete data may be configured to determine whether the replacement event occurs in at least one process cartridge. The time interval between the process cartridge chip receiving the complete data obtaining instruction and sending the complete data to the data control unit 101 is t1, and the time interval between receiving the binding-message obtaining instruction and sending the response message to the engine control unit 102 is t2, where t1 may be greater than t2. Therefore, the time needed for the engine control unit 102 to obtain the binding message from the process cartridge chip of the process cartridge 100 may be shorter than the time needed for the data control unit 101 to obtain the complete data of the process cartridge chip of the process cartridge 100. That is, after the engine control unit 102 completes startup, whether to perform the first image-forming preparation or color correction preparation process may be determined in advance, which may shorten the first page output time of the image-forming apparatus 10 and bring convenience to the user. The complete data may be stored in the fourth preset storage apparatus. The fourth preset storage apparatus may be disposed in the process cartridge chip, or the fourth preset storage apparatus may be disposed in an external device connected to the process cartridge chip. It should be noted that the fourth preset storage apparatus, the first preset storage apparatus and the second preset storage apparatus mentioned above may be a same storage unit; the third preset storage apparatus may also be a same storage unit as any one of the first preset storage apparatus and the second preset storage apparatus mentioned above; and the first preset storage apparatus and the second preset storage apparatus which are mentioned above and the third preset storage apparatus may also be three different storage units respectively. Specific locations of these storage apparatuses refer to detailed description in "the first preset storage apparatus and the second preset storage apparatus mentioned above may be same or different" and may not be described in detail herein.

In one embodiment, when the determination result of whether the replacement event occurs in at least one process cartridge is that the replacement event does not occur, the determination result of whether the replacement event occurs in at least one process cartridge determined by the data control unit 101 may be configured to determine whether the first image-forming preparation operation is performed before the data control unit 101 completes startup. When the determination result of whether the replacement event occurs in at least one process cartridge is that the replacement event occurs, the determination result of whether the replacement event occurs in at least one process cartridge determined by the data control unit 101 may be configured to determine whether the image-forming apparatus 10 is controlled to perform the second image-forming preparation operation including the color correction preparation process before the data control unit 101 completes startup or not to perform the first image-forming preparation operation.

Exemplary Embodiment Ten

Embodiments of the present disclosure further provide the process cartridge 100, which may include a housing, a developer accommodating portion, and the process cartridge chip provided by any embodiments of the present disclosure. The developer accommodating portion may be located in the housing and configured to accommodate the developer.

In one embodiment, the process cartridge 100 may further include a developer conveying element configured to convey the developer.

In one embodiment, the process cartridge 100 may further include a photosensitive drum and a charging roller. The charging roller may be configured to charge the photosensitive drum.

Embodiments of the present disclosure further provide the process cartridge 100, which may include a photosensitive drum, a charging roller, and the process cartridge chip provided by any embodiments of the present disclosure. The charging roller may be configured to charge the photosensitive drum.

Embodiments of the present disclosure further provide a process cartridge chip set, which may include the plurality of process cartridge chips provided in any embodiments of the present disclosure.

Embodiments of the present disclosure further provide a process cartridge set, which may include at least two process cartridges 100. The process cartridge chip provided by any embodiment of the present disclosure may be installed on the process cartridge 100.

Exemplary Embodiment Eleven

Embodiments of the present disclosure further provides a control apparatus. The control apparatus may include the first sending unit configured to send response message to the engine control unit 102 after the engine control unit 102 completes startup and before the data control unit 101 completes startup. The response message may be configured to determine whether the replacement event occurs in at least one process cartridge 100. The determination result of whether the replacement event occurs in at least one process cartridge 100 may be configured to determine whether the preset image-forming preparation operation is performed before the data control unit 101 completes startup.

In one embodiment, above-mentioned control apparatus may further include the first obtaining unit configured to obtain the second verification message or the second verification conversion message, where the second verification conversion message is obtained by converting the second verification message according to the second preset rule; and the first receiving unit, configured to, after the engine control unit 102 completes startup and before the data control unit 101 completes startup, receive the binding-message obtaining instruction sent by the engine control unit 102, where the binding-message obtaining instruction may include the first verification message.

For example, the first sending unit may be configured to obtain the first binding message if the first verification message is equal to the second verification message and send response message including the first binding message to the engine control unit; and send response message including error message to the engine control unit 102 if the first verification message is not equal to the second verification message.

In one embodiment, above-mentioned control apparatus may further include the first comparison unit configured to compare the first verification message and the second verification message and determine whether the first verification message is equal to the second verification message.

In one embodiment, above-mentioned control apparatus may further include the first conversion unit configured to convert the second verification conversion message into the second verification message.

In one embodiment, above-mentioned control apparatus may further include the second conversion unit configured to convert the first verification message into first verification conversion message according to the second preset rule; and the second comparison unit configured to compare the first verification conversion message and the second verification conversion message; and determine whether the first verification message is equal to the second verification message based on whether the first verification conversion message is equal to the second verification conversion message. For example, if the first verification conversion message is equal to the second verification conversion message, it determines that the first verification message is equal to the second verification message; and if the first verification conversion message is not equal to the second verification conversion message, it determines that the first verification message is not equal to the second verification message.

In one embodiment, above-mentioned control apparatus may further include the second obtaining unit configured to obtain the first binding conversion message, where the first binding conversion message is obtained by converting the first binding message according to the first preset rule; and the second conversion unit configured to convert the first binding conversion message into the first binding message.

In one embodiment, above-mentioned control apparatus may further include the second receiving unit, configured to receive the binding-message writing instruction including the first binding message and store the first binding message or the first binding conversion message based on the binding-message writing instruction.

In one embodiment, above-mentioned control apparatus may further include the third receiving unit, configured to receive the binding-message writing instruction including the first binding message and the second verification message and store the first binding message or the first binding conversion message based on the binding-message writing instruction.

In one embodiment, above-mentioned control apparatus may further include feedback unit, configured to send verification response message to the engine control unit after the receiving unit receives the binding-message writing instruction. The verification response message may be configured to determine whether the first binding message in the binding-message writing instruction is correctly written into the process cartridge chip.

For example, if the first binding message is correctly written into the process cartridge chip, the feedback unit may feedback the first binding message or return indication information indicating that the first binding message has been correctly written.

It should be noted that the first sending unit, the first obtaining unit, the first receiving unit, the first comparison unit, the first conversion unit, the second conversion unit, the second comparison unit, the second obtaining unit, the second conversion unit, the second receiving unit, the third receiving unit and the feedback unit may be implemented using a software manner or a hardware manner.

In one implementation manner, at least one of the first sending unit, the first obtaining unit, the first receiving unit, the first comparison unit, the first conversion unit, the second conversion unit, the second comparison unit, the second obtaining unit, the second conversion unit, the second receiving unit, the third receiving unit and the feedback unit may be an external module outside the process cartridge chip that is electrically connected to the process cartridge chip. That is, above-mentioned process cartridge 100 may include the process cartridge chip and an external module electrically connected to the process cartridge chip.

For example, the first comparison unit and the second comparison unit may be configured to obtain messages and compare whether obtained messages are consistent. For example, an input unit, a logic comparison circuit, and an output unit may be included. The logic comparison circuits may include logic units such as AND gate circuits, OR gate circuits, NOT gate circuits, flip-flops and the like. Those skilled in the art may select suitable circuit units according to actual need, which may not be limited in embodiments of the present disclosure.

For example, the first conversion unit and the second conversion unit may be configured to obtain message, perform arithmetic and logical conversion on obtained message, and output converted message. The first conversion unit and the second conversion unit may include, for example, an input unit, an arithmetic circuit, and an output unit. The arithmetic circuit may include logic gate circuits (AND circuits, OR gate circuits, NOT gate circuits and the like), combinational logic circuits (multiplexers, decoders, encoders and the like), arithmetic circuits (adders), flip-flops and the like. Those skilled in the art may select suitable circuit units according to actual need, which may not be limited in embodiments of the present disclosure. The first comparison unit and the second comparison unit may be same unit or two units respectively.

For example, the first obtaining unit, the first receiving unit, the second obtaining unit, the second receiving unit, the first sending unit, the third receiving unit and the feedback unit may be configured to receive and send messages. The first obtaining unit, the first receiving unit, the second obtaining unit, the second receiving unit, the first sending unit, the third receiving unit and the feedback unit may be same communication interface or multiple communication interfaces respectively. Above-mentioned control apparatus may communicate with the data control unit 101 and the engine control unit 102 of the image-forming apparatus 10 through the communication interface.

In an optional implementation manner, the first sending unit, the first obtaining unit, the first receiving unit, the first comparison unit, the first conversion unit, the second conversion unit, the second comparison unit, the second obtaining unit, the second conversion unit, the second receiving unit, the third receiving unit and the feedback unit may not be other units of the external modules other than the process cartridge chip that are electrically connected to the process cartridge chip and may be control units configured into the processing cartridge chip.

In an optional implementation manner, the first sending unit, the first obtaining unit, the first receiving unit, the first comparison unit, the first conversion unit, the second conversion unit, the second comparison unit, the second obtaining unit, the second conversion unit, the second receiving unit, the third receiving unit and the feedback unit which are mentioned above may be included in the control unit configured in the process cartridge chip.

It should be noted that specific content involved in embodiments of the present disclosure may be referred to above description and may not be described in detail herein for the sake of simplicity.

Exemplary Embodiment Twelve

Corresponding to above-mentioned exemplary embodiment ten, embodiments of the present disclosure further provides a process cartridge.

The process cartridge may include a casing; a developer accommodating portion in the casing for accommodating the developer; and the control apparatus described in above-mentioned embodiment.

It should be noted that specific content of the control apparatus may be referred to above description and may not be described in detail herein for the sake of simplicity.

Exemplary Embodiment Thirteen

Corresponding to above-mentioned exemplary embodiment eleven, embodiments of the present disclosure further provides a control method of an image-forming apparatus. The control method may include sending the response message to the engine control unit 102 after the engine control unit 102 completes startup and before the data control unit 101 completes startup. The response message may be configured to determine whether the replacement event occurs in at least one process cartridge 100. The determination result of whether the replacement event occurs in at least one process cartridge 100 may be configured to determine whether the preset image-forming preparation operation is performed before the data control unit 101 completes startup.

In an optional implementation manner, sending the response message to the engine control unit may include receiving the binding-verification reading instruction from the engine control unit 102, where the binding-verification reading instruction includes the first binding message; verifying the binding-message obtaining instruction according to the first verification message; and sending the response message to the engine control unit according to the verification result of the binding-message obtaining instruction.

In an optional implementation manner, sending the response message to the engine control unit according to the verification result of the binding-message obtaining instruction may include verifying the first verification message; and if the verification is successful, sending the response message including the preset binding message to the engine control unit; and if the verification is unsuccessful, sending the response message including the error message.

In an optional implementation manner, verifying the binding-message obtaining instruction according to the first verification message may include determining whether the first verification message is equal to the second verification message; and sending the response message to the engine control unit according to the verification result of the binding-message obtaining instruction may include if the first verification message is equal to the second verification message, sending the response message including the first binding conversion message to the engine control unit; and if the first verification conversion message is not equal to the second verification message, sending the response message including the error message to the engine control unit.

In an optional implementation manner, the control method may include receiving the binding-message writing instruction, where the binding-message writing instruction includes the first binding message; and sending the response message to the engine control unit according to the verification result of the binding-message obtaining instruction, where the verification response message is configured to determine whether the first binding message in the binding-message writing instruction is correctly written into the process cartridge chip.

In an optional implementation manner, the binding-message writing instruction may include the second verification message. Sending the response message to the engine control unit according to the binding-message writing instruction may include receiving the binding-message obtaining instruction sent by the engine control unit, where the binding-message obtaining instruction includes the first verification message; determining whether the first verification message and the second verification message are equal to each other; if the first verification message is equal to the second verification message, sending the response message including the first binding conversion message to the engine control unit; and if the first verification conversion message is not equal to the second verification conversion message, sending the response message including the error message to the engine control unit.

In an optional implementation manner, the determination result of whether the replacement event occurs in the at least one process cartridge is configured to determine whether a preset image-forming preparation operation is executed before the data control unit completes startup, which may include that the determination result that no replacement event occurs in the at least one process cartridge may be configured to control the image-forming apparatus to perform the first image-forming preparation operation before the data control unit completes startup; or the determination result that the replacement event occurs in the at least one process cartridge may be configured to, before the data control unit completes startup, control the image-forming apparatus to perform the second image-forming preparation operation including a color correction preparation process.

In an optional implementation manner, if the determination result of whether the replacement event occurs in the at least one process cartridge is that the replacement event occurs, the determination result of whether the replacement event occurs in the at least one process cartridge may be configured to determine whether the image-forming apparatus is controlled to perform the second image-forming preparation operation before the data control unit completes startup, where the second image-forming preparation operation may include an operation of resetting the control voltage of the density sensor, an operation of clearing the calculation parameter of the target voltage for toner supply control, a stirring action of the time length t3 on the developer in the process cartridge, or a combination thereof.

And/or, if the determination result of whether the replacement event occurs in the at least one process cartridge is that no replacement event occurs, the determination result of whether the replacement event occurs in the at least one process cartridge may be configured to determine whether the first image-forming preparation operation, including the stirring action of the time length t4 on the developer in the process cartridge, is performed before the data control unit completes startup, where t3>t4.

In above-mentioned embodiments, the methods provided by embodiments of the present disclosure are described. In order to realize each function in the methods provided by above-mentioned embodiments of the present disclosure, main equipment or devices for executing above-mentioned methods, such as the engine control unit, the process cartridge chip and the like, may include hardware structures and/or software modules, such that above-mentioned functions may be implemented in the form of hardware structures, software modules, or hardware structures plus software modules. Whether one of above-mentioned functions is performed as a hardware structure, a software module, or a hardware structure plus a software module may depend on specific application and design constraints of the technical solution. It should be understood that the division of all modules in the device may be only a logical function division. In actual implementation, all modules may be fully or partially integrated into a physical entity or may be physically separated. In addition, these modules may all be implemented in the form of software by calling processing elements; or may also all be implemented in the form of hardware. Some modules may also be implemented in the form of software by calling processing elements, and some modules may be implemented in the form of hardware.

Method embodiments mentioned above may be implemented in whole or in part by software, hardware, firmware, or any combination thereof. When being implemented by software, method embodiments mentioned above may be implemented in whole or in part in the form of a computer program product. The computer program product may include one or more computer instructions. When the computer program instructions are loaded and executed on a computer, all or a part of the processes or functions described in embodiments of the present disclosure may be generated.

Figure 6:
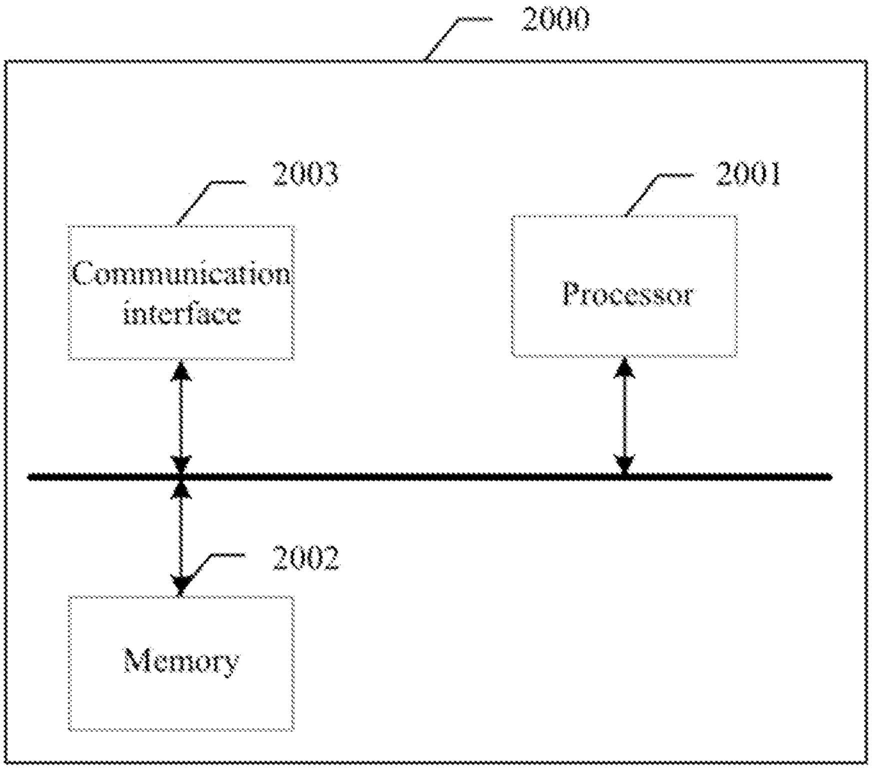
FIG. 6 illustrates a structural schematic of an electronic device provided by exemplary embodiments of the present disclosure.

Exemplarily, FIG. 6 illustrates a structural schematic of an electronic device provided by exemplary embodiments of the present disclosure. The electronic device may be configured to perform any methods in above-mentioned embodiments in the present disclosure. As shown in FIG. 6, the electronic device provided by the present disclosure may include at least one processor 2001 and a memory 2002. Computer instructions may be stored in the memory 2002, and at least one processor 2001 may execute the computer instructions. When the processor 2001 executes computer instructions, the processor 2001 may be configured to perform steps in the methods performed by any one of the engine control unit, the process cartridge chip, or the data control unit in above-mentioned embodiments of the present disclosure. In one embodiment, the processor 2001 may perform communication through a communication interface 2003, such as sending and receiving various message, instructions and the like.

Embodiments of the present disclosure further provide a computer-readable storage medium. The computer-readable storage medium may store computer instructions. When the processor executes the computer instructions, the processor may be configured to perform any methods performed by the engine control unit, the process cartridge chip or the data control unit in above-mentioned embodiments of the present disclosure.

Embodiments of the present disclosure further provide a semiconductor that executes instructions. The semiconductor may be configured to perform any methods performed by the engine control unit, the process cartridge chip or the data control unit as mentioned above in the present disclosure.

Embodiments of the present disclosure further provide a computer program product. The computer program product may include a computer program. The computer program may be stored in a storage medium. At least one processor may read the computer program from the storage medium. When at least one processor executes the computer program, any methods executed by the engine control unit, the process cartridge chip or the data control unit as mentioned above in the present disclosure may be implemented.

Those skilled in the art should understand that all or a part of the steps to implement above-mentioned method embodiments may be completed by hardware related to program instructions. Above-mentioned program may be stored in a computer-readable storage medium. When the program is executed, the steps including in above-mentioned method embodiments may be executed. Above-mentioned storage media may include ROM, RAM, magnetic disks, optical disks and other media that can store program codes.

Compared with the existing technology, the technical solutions provided by the present disclosure may achieve at least the following beneficial effects.

For the control method of the image-forming apparatus, the image-forming apparatus, and the process cartridge chip of the present disclosure, after being successfully started, the engine control unit of the image-forming apparatus may determine whether the replacement event occurs in at least one process cartridge and control the image-forming apparatus to perform the preset image-forming preparation operation according to whether the replacement event occurs in at least one process cartridge. Since the startup time needed by the engine control unit is relatively short, the engine control unit may perform the preparation operation more quickly after startup, which may reduce the time interval between powering on the image-forming apparatus and subsequent printing processes (e.g., the image-forming apparatus performs the first page printing process). For example, the image-forming apparatus may perform the first page printing process as quickly as possible, thereby shortening the first page output time of the image-forming apparatus. When the user uses the image-forming apparatus, the user may obtain the image printed by the image-forming apparatus more quickly after the image-forming apparatus is powered on, thereby improving the user experience of the image-forming apparatus.

It should be noted that above-mentioned embodiments may be only configured to illustrate the technical solution of the present disclosure but may not limit the present disclosure. Although the present disclosure has been described in detail with reference to above-mentioned embodiments, those skilled in the art should understand that the technical solutions described in above-mentioned embodiments may be modified, or equivalent substitutions for some or all of the technical features may be made. However, these modifications or substitutions may not cause the essence of corresponding technical solutions to depart from the scope of the technical solutions of above-mentioned embodiments of the present disclosure.

What is claimed is:

1. A control method of at least one process cartridge of an image-forming apparatus, being applied to a control apparatus, wherein the image-forming apparatus includes a data control unit and an engine control unit, the method comprising:

after the engine control unit completes startup and before the data control unit completes startup, sending a response message to the engine control unit, wherein the response message is configured to determine whether a replacement event occurs in the at least one process cartridge; and a determination result of whether the replacement event occurs in the at least one process cartridge is configured to determine whether a preset image-forming preparation operation is executed before the data control unit completes startup.

2. The method according to claim 1, wherein sending the response message to the engine control unit includes:

receiving a binding-message obtaining instruction sent by the engine control unit, wherein the binding-message obtaining instruction includes a first verification message;

verifying the binding-message obtaining instruction according to the first verification message; and sending the response message to the engine control unit according to a verification result of the binding-message obtaining instruction.

3. The method according to claim 2, wherein sending the response message to the engine control unit according to the verification result of the binding-message obtaining instruction includes:

verifying the first verification message; and if verification is successful, sending the response message including a preset binding message to the engine control unit; and if verification is unsuccessful, sending the response message including an error message.

4. The method according to claim 2, wherein verifying the binding-message obtaining instruction according to the first verification message includes:

determining whether the first verification message is equal to a second verification message, wherein:

sending the response message to the engine control unit according to the verification result of the binding-message obtaining instruction includes:

if the first verification message is equal to the second verification message, sending the response message including a first binding message to the engine control unit; and if the first verification message is not equal to the second verification message, sending the response message including an error message to the engine control unit.

5. The method according to claim 1, further including:

receiving a binding-message writing instruction, wherein the binding-message writing instruction includes a first binding message; and sending a verification response message to the engine control unit according to the binding-message writing instruction, wherein the verification response message is configured to determine whether the first binding message is correctly written into a process cartridge chip.

6. The method according to claim 5, wherein the binding-message writing instruction includes a second verification message, and sending the verification response message to the engine control unit according to the binding-message writing instruction includes:

receiving a binding-message obtaining instruction sent by the engine control unit, wherein the binding-message obtaining instruction includes a first verification message;

determining whether the first verification message is equal to the second verification message;

if the first verification message is equal to the second verification message, sending the response message including the first binding message to the engine control unit; and if the first verification message is not equal to the second verification message, sending the response message including an error message to the engine control unit.

7. The method according to claim 1, wherein the determination result of whether the replacement event occurs in the at least one process cartridge configured to determine whether the preset image-forming preparation operation is executed before the data control unit completes startup includes:

a determination result that no replacement event occurs in the at least one process cartridge is configured to control the image-forming apparatus to perform a first image-forming preparation operation before the data control unit completes startup; or a determination result that the replacement event occurs in the at least one process cartridge is configured to, before the data control unit completes startup, control the image-forming apparatus to perform a second image-forming preparation operation including a color correction preparation process.

8. The method according to claim 1, wherein:

if a determination result of whether the replacement event occurs in the at least one process cartridge is that the replacement event occurs, the determination result of whether the replacement event occurs in the at least one process cartridge is configured to determine whether the image-forming apparatus is controlled to perform a second image-forming preparation operation before the data control unit completes startup, wherein the second image-forming preparation operation includes an operation of resetting a control voltage of a density sensor, an operation of clearing a calculation parameter of a target voltage for toner supply control, a stirring action of a time length t3 on a developer in the at least one process cartridge, or a combination thereof; and/or if a determination result of whether the replacement event occurs in the at least one process cartridge is that no replacement event occurs, the determination result of whether the replacement event occurs in the at least one process cartridge is configured to determine whether a first image-forming preparation operation, including a stirring action of a time length t4 on the developer in the at least one process cartridge, is performed before the data control unit completes startup, wherein t3>t4.

9. A control apparatus, wherein the control apparatus is configured to communicate with a data control unit and an engine control unit which are included in an image-forming apparatus, the control apparatus comprising:

a sending unit, configured to, after the engine control unit completes startup and before the data control unit completes startup, send a response message to the engine control unit, wherein the response message is configured to determine whether a replacement event occurs in at least one process cartridge; and a determination result of whether the replacement event occurs in the at least one process cartridge is configured to determine whether a preset image-forming preparation operation is executed before the data control unit completes startup.

10. The control apparatus according to claim 9, further including:

an obtaining unit, configured to receive a binding-message obtaining instruction sent by the engine control unit, wherein the binding-message obtaining instruction includes a first verification message; and a verifying unit, configured to verify the binding-message obtaining instruction according to the first verification message, wherein:

the sending unit is further configured to send the response message to the engine control unit according to a verification result of the binding-message obtaining instruction.

11. The control apparatus according to claim 10, wherein:

the verifying unit is further configured to verify the first verification message; and the sending unit is further configured to send the response message including a preset binding message to the engine control unit if verification is successful and send the response message including an error message to the engine control unit if verification is unsuccessful.

12. The control apparatus according to claim 10, wherein:

the verifying unit is further configured to determine whether the first verification message is equal to a second verification message; and the sending unit is further configured to, if the first verification message is equal to the second verification message, send the response message including a first binding message to the engine control unit; and if the first verification message is not equal to the second verification message, send the response message including an error message to the engine control unit.

13. The control apparatus according to claim 9, further including:

an obtaining unit, configured to receive a binding-message writing instruction, wherein the binding-message writing instruction includes a first binding message, wherein:

the sending unit is further configured to send a verification response message to the engine control unit according to the binding-message writing instruction, wherein the verification response message is configured to determine whether the first binding message is correctly written into a process cartridge chip.

14. The control apparatus according to claim 13, wherein:

the binding-message writing instruction includes a second verification message;

the obtaining unit is further configured to receive a binding-message obtaining instruction sent by the engine control unit, wherein the binding-message obtaining instruction includes a first verification message;

a verifying unit is configured to determine whether the first verification message is equal to the second verification message; and the sending unit is further configured to send the response message including the first binding message to the engine control unit if the first verification message is equal to the second verification message and send the response message including an error message to the engine control unit if the first verification message is not equal to the second verification message.

15. The control apparatus according to claim 9, wherein the determination result of whether the replacement event occurs in the at least one process cartridge configured to determine whether the preset image-forming preparation operation is executed before the data control unit completes startup includes:

a determination result that no replacement event occurs in the at least one process cartridge is configured to control the image-forming apparatus to perform a first image-forming preparation operation before the data control unit completes startup; or a determination result that the replacement event occurs in the at least one process cartridge is configured to, before the data control unit completes startup, control the image-forming apparatus to perform a second image-forming preparation operation including a color correction preparation process.

16. The control apparatus according to claim 9, wherein if a determination result of whether the replacement event occurs in the at least one process cartridge is that the replacement event occurs, the determination result of whether the replacement event occurs in the at least one process cartridge is configured to determine whether the image-forming apparatus is controlled to perform a second image-forming preparation operation before the data control unit completes startup, wherein the second image-forming preparation operation includes an operation of resetting a control voltage of a density sensor, an operation of clearing a calculation parameter of a target voltage for toner supply control, a stirring action of a time length t3 on a developer in the process cartridge, or a combination thereof; and/or if a determination result of whether the replacement event occurs in the at least one process cartridge is that no replacement event occurs, the determination result of whether the replacement event occurs in the at least one process cartridge is configured to determine whether a first image-forming preparation operation, including a stirring action of a time length t4 on the developer in the process cartridge, is performed before the data control unit completes startup, wherein t3>t4.

17. A process cartridge, comprising:
a cartridge body;
a developer accommodation portion in the cartridge body for containing a developer; and
the control apparatus according to claim 9.

18. The process cartridge according to claim 17, further including:
a developer conveying element, configured to convey the developer.

19. The process cartridge according to claim 18, further including:
a photosensitive drum; and
a charging roller, configured to charge the photosensitive drum.

20. A process cartridge, comprising:
a photosensitive drum;
a charging roller, configured to charge the photosensitive drum; and
the control apparatus according to claim 9.

* * * * *